(12) United States Patent
Shibutani et al.

(10) Patent No.: US 9,083,507 B2
(45) Date of Patent: Jul. 14, 2015

(54) DATA PROCESSING DEVICE, DATA PROCESSING METHOD, AND PROGRAM

(75) Inventors: Kyoji Shibutani, Tokyo (JP); Toru Akishita, Tokyo (JP); Takanori Isobe, Tokyo (JP); Taizo Shirai, Kanagawa (JP); Harunaga Hiwatari, Kanagawa (JP); Atsushi Mitsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 14/006,392

(22) PCT Filed: Feb. 20, 2012

(86) PCT No.: PCT/JP2012/053932
§ 371 (c)(1),
(2), (4) Date: Sep. 20, 2013

(87) PCT Pub. No.: WO2012/132622
PCT Pub. Date: Oct. 4, 2012

(65) Prior Publication Data
US 2014/0003603 A1    Jan. 2, 2014

(30) Foreign Application Priority Data

Mar. 28, 2011  (JP) .................................. 2011-069184
Sep. 22, 2011  (JP) .................................. 2011-207704

(51) Int. Cl.
*H04L 29/06* (2006.01)
*H04L 9/06* (2006.01)
(52) U.S. Cl.
CPC .................................... *H04L 9/0625* (2013.01)
(58) Field of Classification Search
None
See application file for complete search history.

(56) References Cited

U.S. PATENT DOCUMENTS

| | | | |
|---|---|---|---|
| 6,201,869 B1 | 3/2001 | Matsui et al. | |
| 6,289,455 B1 * | 9/2001 | Kocher et al. | 713/194 |
| 6,751,319 B2 * | 6/2004 | Luyster | 380/37 |
| 8,073,140 B2 | 12/2011 | Shirai et al. | |

(Continued)

FOREIGN PATENT DOCUMENTS

| | | |
|---|---|---|
| FR | 2 920 617 A1 | 3/2009 |
| JP | 11-024558 A | 1/1999 |

OTHER PUBLICATIONS

Canright, "A Very Compact S-Box for AES", 2005, International Association for Cryptographic Research, pp. 1-15.*

(Continued)

*Primary Examiner* — Benjamin Lanier
(74) *Attorney, Agent, or Firm* — Sony Corporation

(57) ABSTRACT

A miniaturized non-linear conversion unit is achieved. Included is an encryption processing part configured to divide and input configuration bits of data to be processed into a plurality of lines, and to repeatedly execute a data conversion processing applying a round function as to the data in each line, wherein the encryption processing part includes an F function executing unit configured to input one line of data configuring the plurality of lines, and to generate conversion data, wherein the F function executing unit includes a non-linear conversion processing unit configured to execute a non-linear conversion processing, and wherein the non-linear conversion processing unit includes a repeating structure of a non-linear calculation unit made up from either one NAND or NOR, and either one XOR or XNOR calculation unit, and a bit replacement unit. The miniaturized non-linear conversion unit is achieved by this repeating configuration.

12 Claims, 29 Drawing Sheets

(56) References Cited

U.S. PATENT DOCUMENTS

| | | | |
|---|---|---|---|
| 2001/0000708 A1 | 5/2001 | Matsui et al. | |
| 2002/0131589 A1 | 9/2002 | Matsui et al. | |
| 2003/0190041 A1* | 10/2003 | Yokota et al. | 380/44 |
| 2009/0010425 A1 | 1/2009 | Shibutani et al. | |
| 2010/0061548 A1* | 3/2010 | Shirai et al. | 380/28 |

OTHER PUBLICATIONS

Bogdanov, "PRESENT: An Ultra-Lightweight Block Cipher", 2007, pp. 1-13.*

Extended European Search Report issued on Nov. 20, 2014 in the corresponding European Application No. 12764563.8.

Office Action issued on Oct. 21, 2014 in the corresponding Japanese patent Application No. 2011-207704.

"Universal Mobile Telecommunications System (UMTS) ; LTE; Specification of the 3GPP confidentiality and integrity algorithms; Document 2: Kasumi Specification (3GPP TS 35.202 version 9.0.0 Release 9)", Technical Specification, European Telecommunications Standards Institute (ETSI), No. V9.0.0, XP014045969, Feb. 1, 2010, p. 19.

Mitsuru Matsui; "New Block Encryption Algorithm MISTY", Proceedings of fast software encryption workshop, XX, XX, XP002367857, Jan. 1, 1997, pp. 54-68.

D. Canright , "A Very Compact S-Box for AES", Cryptographic Hardware and Embedded Systems—Ches 2005 Lecture Notes in Computer Science;;LNCS, XP 047029426, Aug. 29, 2005; pp. 441-455.

U.S. Appl. No. 14/002,379, filed Aug. 30, 2013, Shibutani, et al.
U.S. Appl. No. 14/005,663, filed Sep. 17, 2013, Shibutani, et al.
U.S. Appl. No. 14/002,462, filed Aug. 30, 2013, Shibutani, et al.
International Search Report issued Mar. 27, 2012 in PCT/JP2012/053932.

Joan Daemen, et al. "The NOEKEON Block Cipher" Nessie Proposal, Nov. 13, 2000, 32 Pages.

Francois-Xavier Standaert, et al., "SEA: A Scalable Encryption Algorithm for Small Embedded Applications" Lecture Notes in Computer Science, Smart Card Research and Advanced Applications, vol. 3928, Mar. 28, 2006, pp. 222-236, with Bibliographic Information pages.

Kyoji Shibutani, et al. "piccolo: An Ultra-Lightweight Blockcipher" Lecture Notes in Computer Science, vol. 6917, Sep. 27, 2011, pp. 342-357.

Chae Hoon Lim "CRYPTON: A New 128-bit Block Cipher—Specification and Analysis" Information and Communications Research Center, 1998, 28 Pages.

Kaisa Nyberg, "Generalized Feistel Networks" Advances in Cryptology, Lecture Notes in Computer Science, vol. 1163, 1996, pp. 91-104.

Pascal Junod, et al. "FOX: a New Family of Block Ciphers" Selected Areas in Cryptography, Lecture Notes in Computer Science, vol. 3357, Aug. 9-10, 2004, pp. 1-16.

Paulo S.L.M. Barreto, et al. "The Whirlpool Hashing Function" Scopus Tecnologia S.A., May 24, 2003, pp. 1-20.

Yuliang Zheng, et al. "On the Construction of Block Ciphers Provably Secure and Not Relying on Any Unproved Hypotheses, Extended Abstract)" Advances in Cryptology, Lecture Notes in Computer Science, vol. 435, 1990, 20 Pages.

"The 128-bit Blockcipher CLEFIA, Algorithm Specification" Sony Corporation, vol. 1, Jun. 1, 2007, 41 Pages.

Aoki, et al. "128-bit Block Encryption Camellia Algorithm Specification", vol. 2, 2001, 39 Pages.

US National Institute of Standards and Technology, "Advanced Encryption Standard (AES)" Federal Information Processing Standards Publication, No. 197, Nov. 26, 2001, 51 Pages.

\* cited by examiner

| x | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| S(x) | f | e | 9 | c | b | a | 5 | 0 | 7 | 6 | 1 | 4 | 11 | 12 | 1f | 18 |
| x | 10 | 11 | 12 | 13 | 14 | 15 | 16 | 17 | 18 | 19 | 1a | 1b | 1c | 1d | 1e | 1f |
| S(x) | 1d | 1e | 1b | 1c | 19 | 1a | 17 | 10 | 16 | 15 | 14 | 13 | 2 | 3 | 8 | d |

DATA PROCESSING DEVICE, DATA PROCESSING METHOD, AND PROGRAM

TECHNICAL FIELD

The present technology is related to a data processing device, a data processing method, and a program. More specifically, the present technology is related to a data processing device, a data processing method, and a program executing a shared key type of encryption, for example.

BACKGROUND ART

As information-oriented societies progress, the demand for information security technologies to safely protect the information used continues to increase. One configuration element of information security technologies is encryption technology, and these encryption technologies are currently used in various products and systems.

There are many different encryption processing algorithms, and one basic example of such a technology is what is known as a shared key block cipher. There are two shared keys with the shared key block cipher, an encryption key and a decryption key. During encryption and decryption processing, multiple keys are generated from the shared keys and data transformation processing is repeatedly executed in units of block data sizes such as 64-bit, 128-bit, and 256-bit block units, for example.

The most common of these shared key block cipher algorithms known are the Data Encryption Standard (DES), which was the previous US standard, and the Advanced Encryption Standard (AES), which is the current US standard. Many other shared key block ciphers exist or have been proposed, including the CLEFIA shared key block cipher proposed by Sony Corporation in 2007.

This kind of shared key block cipher algorithm is mainly configured with an encryption processing part including a round function executing unit for repeatedly executing input data transformations and a key scheduling part for generating round keys applied to each round of the round function unit. The key scheduling part generates an expanded key with increased bit counts based on a master secret key (main key), and then generates round keys (secondary keys) applied for each round function unit of encryption processing part based on the generated expanded key.

A commonly known specific structure for executing this kind of algorithm repeatedly executes a round function that includes a linear conversion unit and a non-linear conversion unit. The most common of this kind of structure is the Feistel structure and the generalized Feistel structure, for example. The Feistel structure and the generalized Feistel structure converts plaintext into ciphertext by a simple repetition of a round function that includes an F function functioning as a data transformation function. The F function executes linear conversion processing and non-linear conversion processing. Further details disclosing encryption processing applying the Feistel structure may be found in NPL 1 and NPL 2, for example.

The non-linear conversion processing executed in the F function is performed, for example, applying a non-linear conversion function called an S-box. This S-box is a configuration element of block ciphers and hash functions, and is an extremely important function in determining security and implementation performance.

This S-box is required for a high level of security. However, there is a problem in which the circuit scale becomes significant in order to ensure a high level of security.

CITATION LIST

Non Patent Literature

NPL 1: K. Nyberg, "Generalized Feistel Networks", ASIACRYPT' 96, SpringerVerlag, 1996, pp. 91-104.
NPL 2: Yuliang Zheng, Tsutomu Matsumoto, Hideki Imai: On the Construction of Block Ciphers Provably Secure and Not Relying on Any Unproved Hypotheses. CRYPTO 1989: 461-480.
NPL 3: US National Institute of Standards and Technology Advanced Encryption Standard, Federal Information Processing Standards Publications No. 197, 2001.
NPL 4: Aoki, Ichikawa, Kanda, Matsui, Moriai, Nakajima, Tokita, "128-bit Block Encryption Camellia Algorithm Specification", Version 2.0, 2001.
NPL 5: Chae Hoon Lim, "CRYPTON: A New 128-bit Block Cipher-Specification and Analysis (Version 0.5)".
NPL 6: Chae Hoon Lim, "CRYPTON: A New 128-bit Block Cipher-Specification and Analysis (Version 1.0)".
NPL 7: Paulo S. L. M Barreto, Vincent Rijmen "The WHIRLPOOL Hashing Function", 2003.
NPL 8: Pascal Junod and Serge Vaudenay, "FOX: a New Family of Block Ciphers", 2004.
NPL 9: Sony Corporation, "The 128-bit Blockcipher CLEFIA Algorithm Specification", Revision 1.0, 2007.

SUMMARY OF INVENTION

Technical Problem

The present disclosure is the result of considering the previously described situation, and aims to provide a data processing device, a data processing method, and a program provisioned with a miniaturizable S-box having a high level of security.

Solution to Problem

A first aspect of the present disclosure is a data processing device including: a data conversion processing unit configured to divide and input configuration bits of data to be processed into a plurality of lines, and to repeatedly execute a data conversion processing as to the data in each line; wherein the data conversion processing unit includes an F function executing unit configured to input one line of data configuring the plurality of lines, and to generate conversion data; wherein the F function executing unit includes a non-linear conversion processing unit configured to execute a non-linear conversion processing; and wherein the non-linear conversion processing unit includes a repeating structure of a non-linear calculation unit made up from either one NAND or NOR, and either one XOR or XNOR calculation unit, and a bit replacement unit.

Regarding an embodiment of the data processing device according to the present disclosure, the bit replacement unit includes a wiring configuration configured to shuffle the input and output bits corresponding to the non-linear calculation unit.

Regarding an embodiment of the data processing device according to the present disclosure, the non-linear conversion processing unit outputs one bit of the calculation result from either the NAND or the NOR calculation unit with 2-bit input and 1-bit output to either the XOR or the XNOR calculation unit, executes either the XOR or the XNOR calculation with the other one bit of input data, and outputs the 1-bit data generated from the calculation result of either the XOR or the XNOR as the configuration bit as the non-linear conversion processing result.

Regarding an embodiment of the data processing device according to the present disclosure, the non-linear conversion processing unit includes a repeating structure in which the non-linear calculation unit is repeating at least an n number of times regarding the configuration to output the non-linear conversion result of n bits of data.

Regarding an embodiment of the data processing device according to the present disclosure, the non-linear conversion processing unit is a configuration in which the non-linear calculation unit is set for an n number of times and the bit replacement unit is set for an n−1 number of times between the non-linear calculation unit for an n number of times regarding the configuration to output the non-linear conversion result of n bits of data.

Regarding an embodiment of the data processing device according to the present disclosure, the non-linear conversion processing unit generates the calculation result for either the XOR or the XNOR calculation result from the calculation result of either the one NAND or the NOR calculation unit corresponding to all configuration bits of the data to be non-linearly converted, and outputs either the XOR or the XNOR calculation result as the configuration bit of the non-linear conversion result.

Regarding an embodiment of the data processing device according to the present disclosure, the non-linear conversion processing unit is a configuration including both the XOR calculation unit and the XNOR calculation unit in the repeating structure.

Regarding an embodiment of the data processing device according to the present disclosure, the data processing device executes encryption processing to convert plaintext as input data into ciphertext, and to execute decryption processing to convert ciphertext as input data into plaintext.

Further, a second aspect of the present disclosure is a data processing device including a non-linear conversion processing unit having a repeating structure of: a non-linear calculation unit made up from either one NAND or NOR calculation unit, and either one XOR or XNOR calculation unit; and a bit replacement unit.

Regarding an embodiment of the data processing device according to the present disclosure, the non-linear conversion processing unit generates the calculation result for either the XOR or the XNOR calculation result from the calculation result of either the one NAND or the NOR calculation unit corresponding to all configuration bits of the data to be non-linearly converted, and outputs either the XOR or the XNOR calculation result as the configuration bit of the non-linear conversion result.

Further, a third aspect of the present disclosure is a data processing device including: a repeating structure of a round function, which includes a non-linear function executing unit configured to divide and input configuration bits of data to be processed into a plurality of lines, and to input one line of data configuring the plurality of lines to generate the conversion data.

Regarding an embodiment of the data processing device according to the present disclosure, the non-linear function executing unit generates the calculation result for either the XOR or the XNOR calculation result from the calculation result of either the one NAND or the NOR calculation unit corresponding to all configuration bits of the data to be non-linearly converted, and outputs either the XOR or the XNOR calculation result as the configuration bit of the non-linear conversion result.

Further, a fourth aspect of the present disclosure is a data processing method to be executed in a data processing device; wherein a data processing unit divides and inputs configuration bits of data to be processed into a plurality of lines, and repeatedly executes a data conversion processing as to the data in each line; wherein the data conversion processing executes an F function configured to input one line of data configuring the plurality of lines, and generates conversion data; wherein the execution processing of the F function executes a non-linear conversion processing; and wherein the non-linear conversion processing executes a repeating calculation applying a non-linear calculation unit made up from either one NAND or NOR calculation unit and either one XOR or XNOR calculation unit, and a bit replacement unit.

Further, a fifth aspect of the present disclosure is a program to execute data conversion processing in a data processing device; wherein the program causes a data processing unit to divide and input configuration bits of data to be processed into a plurality of lines, and to repeatedly execute a data conversion processing as to the data in each line; and in the data conversion processing to execute an F function configured to input one line of data configuring the plurality of lines, and to generate conversion data; and in the execution processing of the F function to execute a non-linear conversion processing; and in the non-linear conversion processing to execute a repeating structure applying a non-linear calculation unit made up from either one NAND or NOR calculation unit and either one XOR or XNOR calculation unit, and a bit replacement unit.

Further, the program according to the present disclosure is a program supplied to a computer system or information processing device capable of executing various program code, for example, by a recording medium, for example. The processing is achieved through the program by executing this kind of program with program executing unit in the information processing device or computer system.

Other objects, features, and advantages of the present disclosure will become clear by the detailed descriptions based on the embodiments of the present invention described later and the attached drawings. Further, the system regarding the present specification is a logical combination configuration of multiple devices, and so each configuration of the devices is not limited to being housed within the same physical unit.

Advantageous Effects of Invention

According to an embodiment of the present disclosure, a miniaturized non-linear conversion unit is achieved.

Specifically, included is an encryption processing part configured to divide and input configuration bits of data to be processed into a plurality of lines, and to repeatedly execute a data conversion processing applying a round function as to the data in each line, wherein the encryption processing part includes an F function executing unit configured to input one line of data configuring the plurality of lines, and to generate conversion data, wherein the F function executing unit includes a non-linear conversion processing unit configured to execute a non-linear conversion processing, and wherein the non-linear conversion processing unit includes a repeating structure of a non-linear calculation unit made up from either one NAND or NOR, and either one XOR or XNOR calculation unit, and a bit replacement unit. The miniaturized non-linear conversion unit is achieved by this repeating configuration.

DESCRIPTION OF EMBODIMENTS

Hereafter, a data processing device, a data processing method, and a program related to the present disclosure will be described in detail with reference to the drawings. The description will occur according to the following items.

1. Shared Key Block Encryption Overview
2. S-boxes
3. Overview of the S-box Related to the Present Disclosure
4. Configuration Examples of Encryption Processing Devices
5. Conclusion Regarding Configuration of the Present Disclosure

[1. Shared Key Block Encryption Overview]

First, an overview of shared key block encryption will be described.

(1-1. Shared Key Block Encryption)

The following definition specifies that which designates shared key block encryption here (hereafter, block encryption).

Block encryption obtains a plaintext P and a key K as input, and outputs a ciphertext C. The bit length of the plaintext and the ciphertext is called a block size, which is written as n. n is an arbitrary integer value that is normally one value determined beforehand for each block encryption algorithm. This case in which the block length is an n block encryption is sometimes called an n-bit block encryption.

The bit length of the key is expressed as k. The key has an arbitrary integer value. The shared key block encryption algorithm can support one or multiple key sizes. For example, for some block encryption algorithm A, the block size is n=128, and so a configuration is possible which supports a key size of k=128, k=192, or k=256.

Plaintext P: n bits
Ciphertext C: n bits
Key K: k bits

Figure 1:
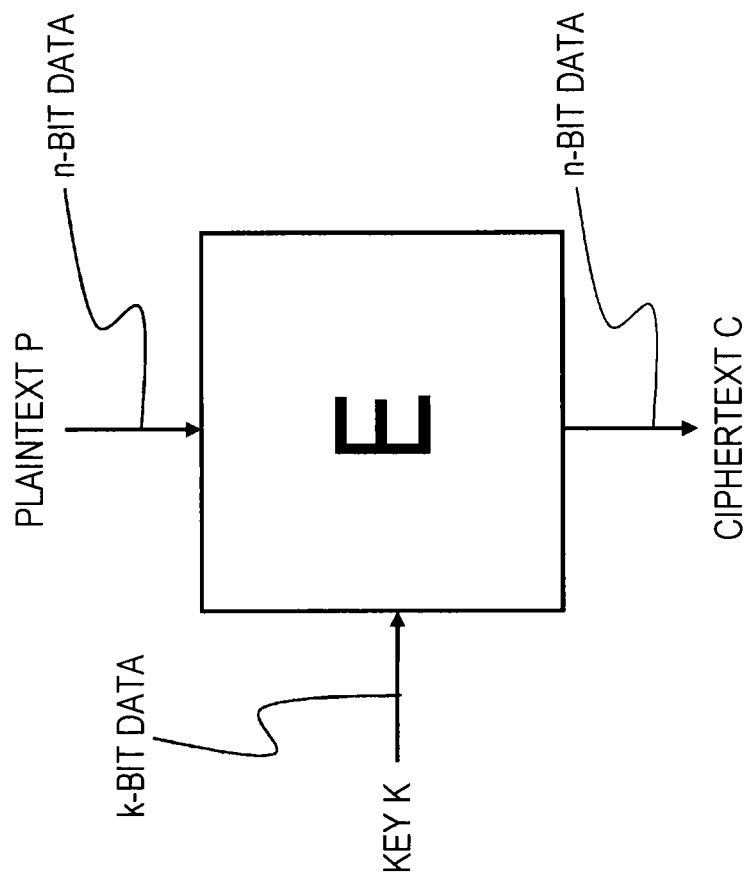
FIG. 1 is a diagram describing an n-bit shared key block encryption algorithm corresponding to a key length of k bits.

FIG. 1 illustrates a diagram of an n-bit shared key block encryption algorithm E corresponding to a key length of k bits.

Figure 2:
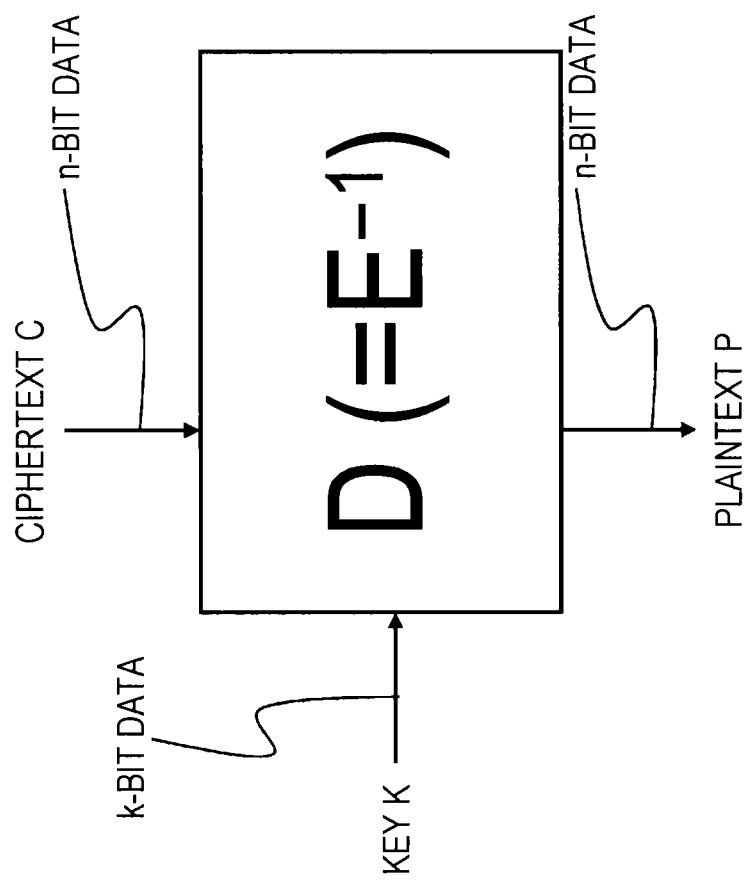
FIG. 2 is a diagram describing a decryption algorithm corresponding to the n-bit shared key block encryption algorithm corresponding to a key length of k bits, illustrated in FIG. 1.

A decryption algorithm D corresponding to the encryption algorithm E can be defined as an inversion function $E^{-1}$ of the encryption algorithm E, which receives the ciphertext C and key K as the input, and outputs the plaintext P. FIG. 2 illustrates a diagram of the decryption algorithm D corresponding to the encryption algorithm E illustrated in FIG. 1.

(1-2. Internal Configuration)

The block encryption thought of as a division into two portions. One is a "key scheduling part" to which the key K is input, and outputs an expanded key K' (bit length k') by expanding the bit length according to certain previously determined steps, and the other is a "data encryption unit" that receives the plaintext P and the key K' expanded from the key scheduling part, performs a data conversion, and outputs the ciphertext C.

Figure 3:
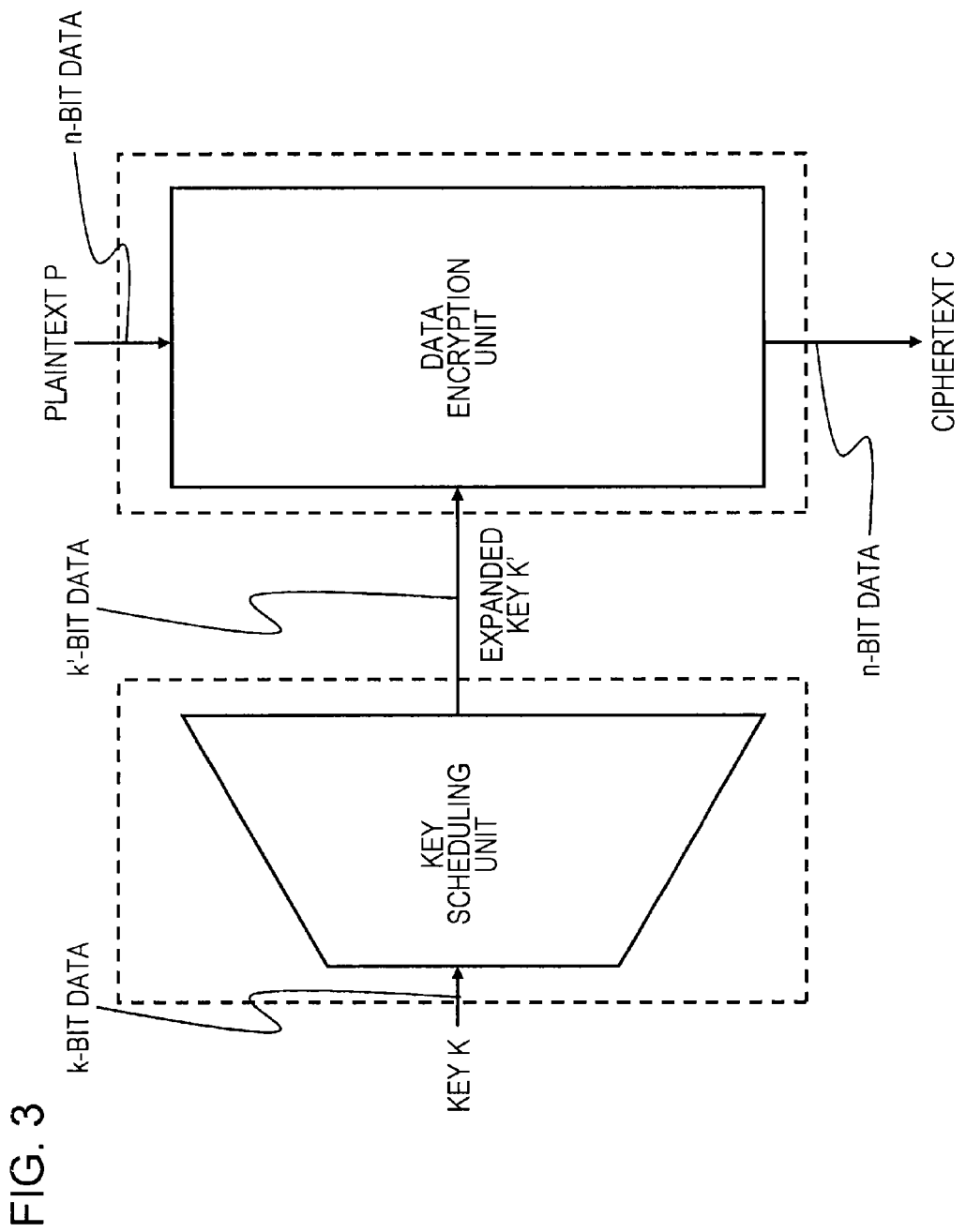
FIG. 3 is a diagram describing a relationship between a key scheduling part and a data encryption unit.

The relationship between these two portions is illustrated in FIG. 3.

(1-3. Data Encryption Unit)

The data encryption unit used in the following embodiments can be divided into processing units called round functions. The round function receives two units of data as the input, conducts processing internally, and outputs one unit of data. One part of the input data is an n-bit data currently being encrypted, which results in a configuration in which the output from the round function for some round is supplied as the input for the next round. The other part of the input data is used as data for a portion of the expanded key output from the key scheduler, and this key data is called the round key. Also, the total number of round functions is called the total round number, and is a value determined beforehand for each encryption algorithm. Here, the total round number is expressed as R.

Figure 4:
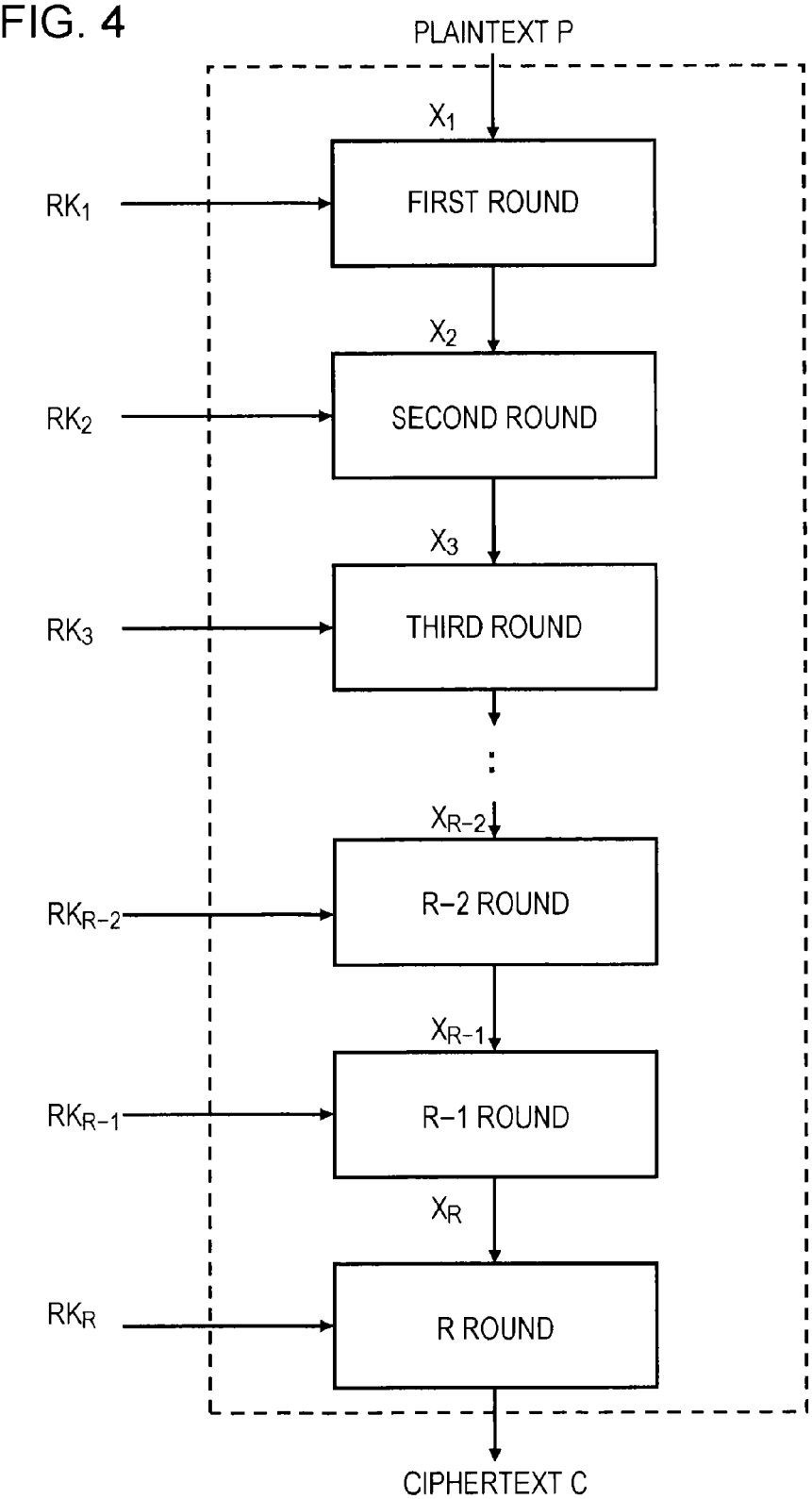
FIG. 4 is a diagram describing an example configuration of the data encryption unit.

An overview of the data encryption unit is illustrated as in FIG. 4 when looking from the input side of the data encryption unit in which the input data for the first round is designated as $X_1$, the data input in the round function for an i number of rounds is designated as $X_i$, and the round key is designated as $RK_i$.

(1-4. Round Function)

The round function can have various forms depending on the block encryption algorithm. The round function can be classified by the structure adopted by this encryption algorithm (structure). Typical structures used here as examples are SPN structures, Feistel structures, and expanded Feistel structures.

(A) SPN Structure Round Function

Figure 5:
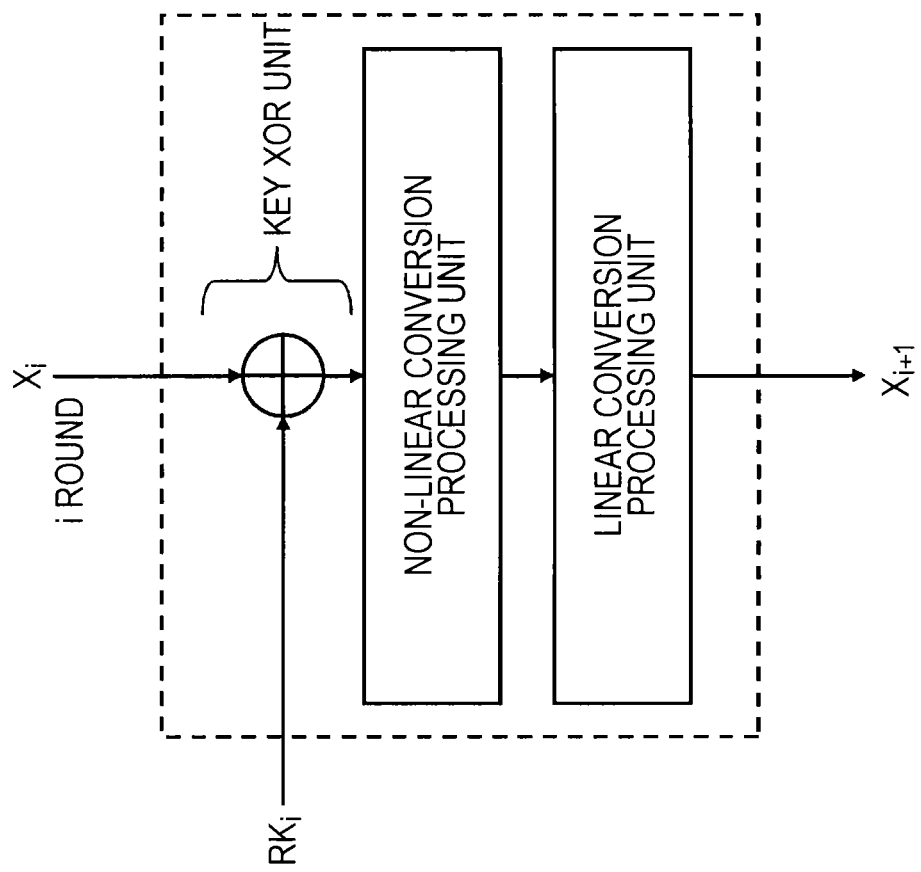
FIG. 5 is a diagram describing an example of an SPN structure round function.

This structure applies linear conversion processing, non-linear conversion, and XOR calculations on the round key and all of the n-bit input data. The order of each calculation is not particularly determined. FIG. 5 illustrates an example of an SPN structure round function.

(B) Feistel Structure

Figure 6:
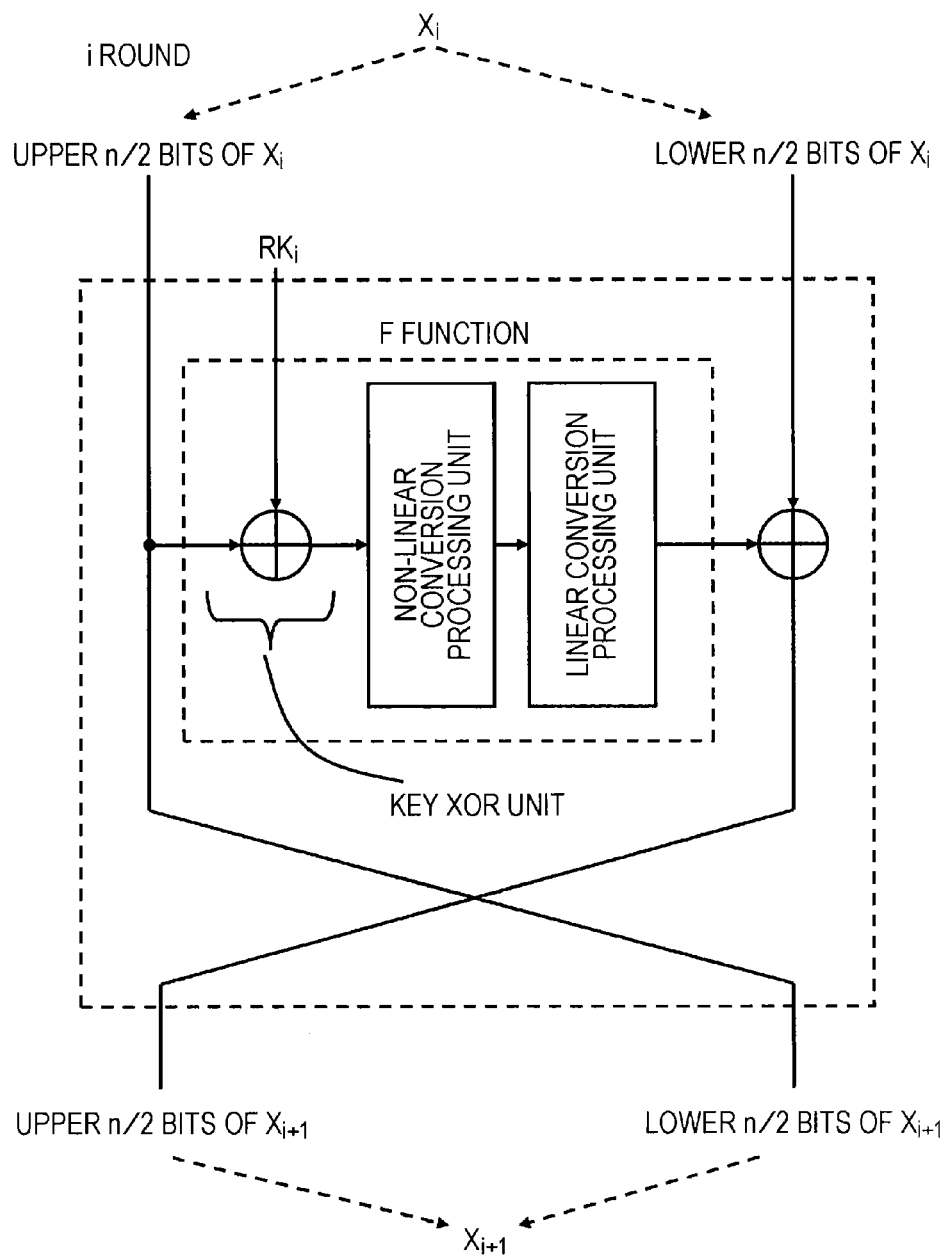
FIG. 6 is a diagram describing an example of a Feistel structure round function.

The n-bit input data is divided into two units of n/2-bit data. A function (F function) is applied with one part of this data and the round key as the input, and the output and the other part of the data is XOR calculated. The result of shuffling both sides of this data becomes the output data. Though there are various types of internal configuration of the F function, but these are basically achieved similarly to the SPN structure with a combination of XOR calculations with the round key data, non-linear calculations, and linear conversions. FIG. 6 illustrates an example of a Feistel structure round function.

(C) Expanded Feistel Structure

Figure 7:
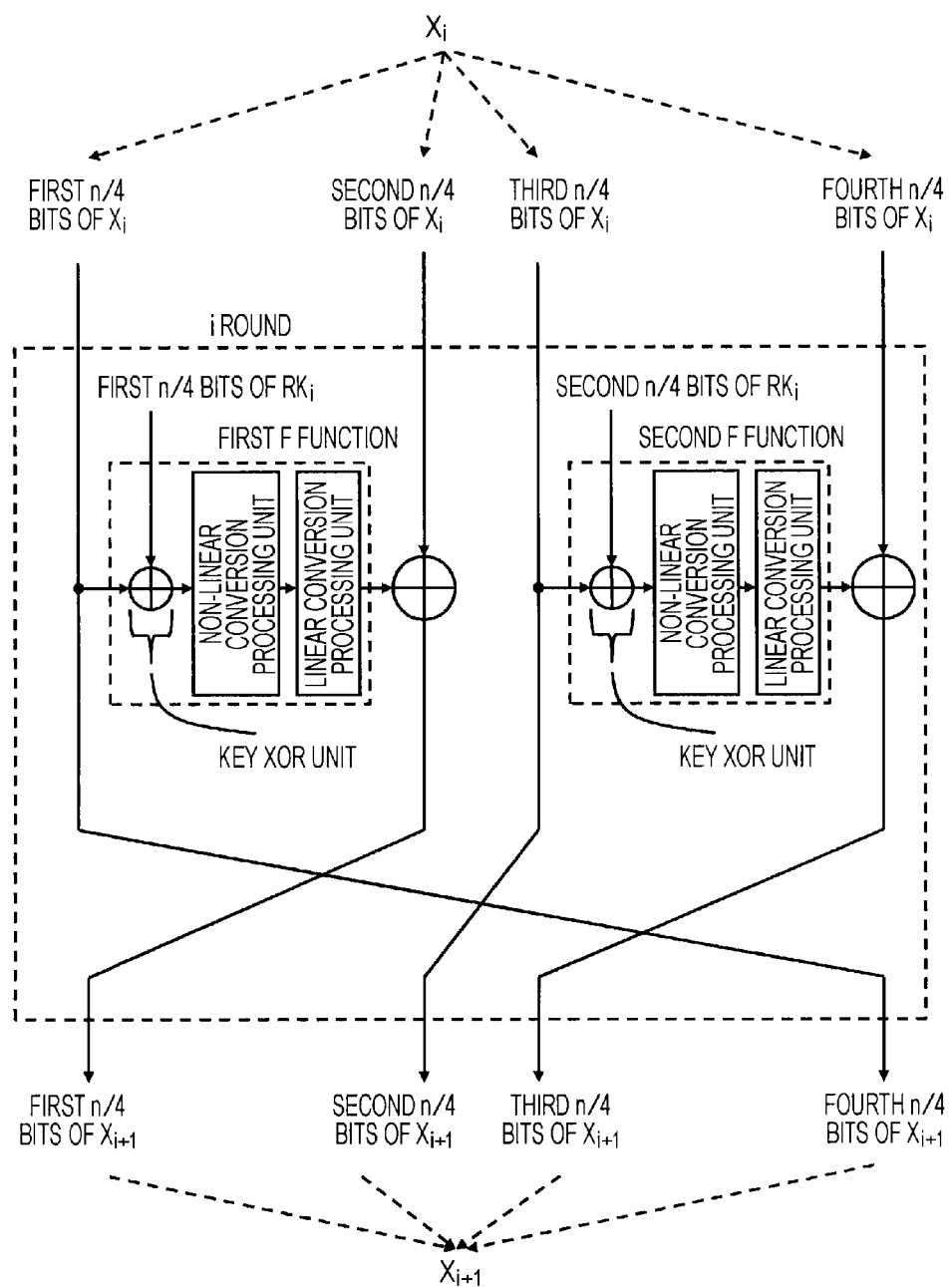
FIG. 7 is a diagram describing an example of an expanded Feistel structure.
Figure 8:
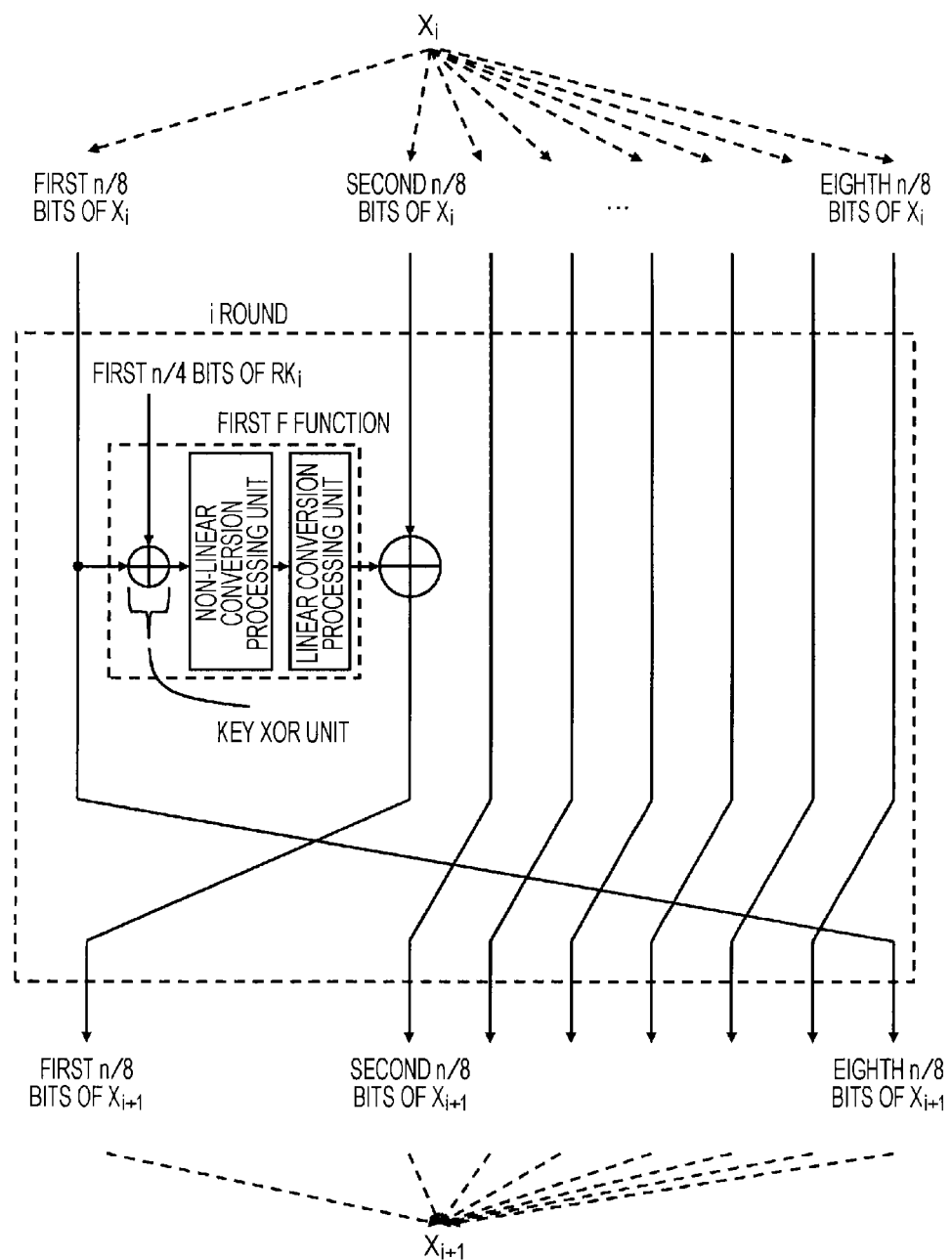
FIG. 8 is a diagram describing an example of an expanded Feistel structure.

The data division number of two regarding the Feistel structure is expanded into a format of three or more divisions with the expanded Feistel structure. If the division number is designated as d, then various expanded Feistel structures can be defined depending on d. As the size if the F function input and output is relatively smaller, this is suited for small implementations. FIG. 7 illustrates an example of an expanded Feistel structure in which d=4, and two F functions are applied in parallel within one round. Also, FIG. 8 illustrates an example of an expanded Feistel structure in which d=8, and one F function is applied within one round.

(1-5. Non-linear Conversion Processing Unit)

Figure 9:
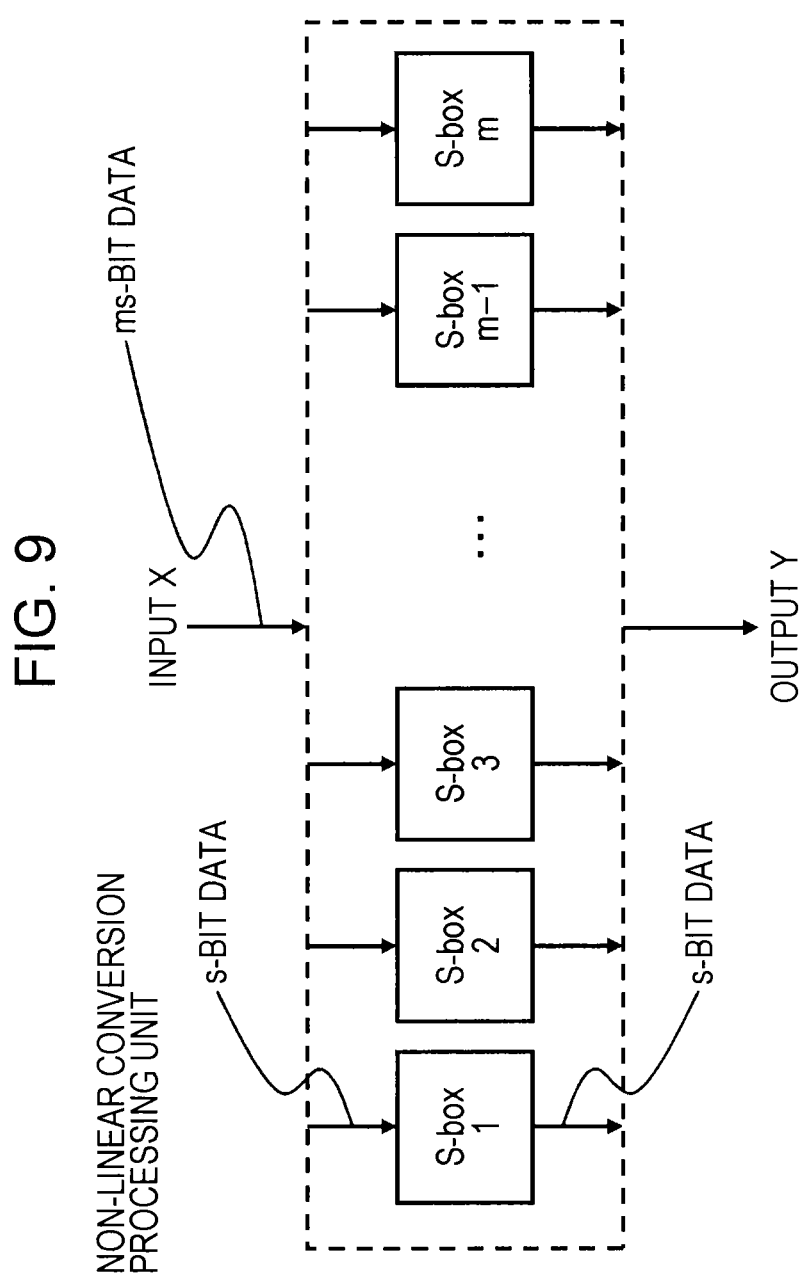
FIG. 9 is a diagram describing an example configuration of a non-linear conversion unit.

The implementation costs tend to increase as the size of the input data increases for non-linear conversion processing units. In order to circumvent this, many configurations are used in which the corresponding data is divided into multiple units, and non-linear conversion is conducted on this data. For example, when the input size is designated as ms bits, these configurations divide an m number of data units every s bits, and perform non-linear conversions on this data in which the input and output is s bits. The non-linear conversions in these s-bit units are called S-boxes. FIG. 9 illustrates an example.

(1-6. Linear Conversion Processing Unit)

Figure 10:
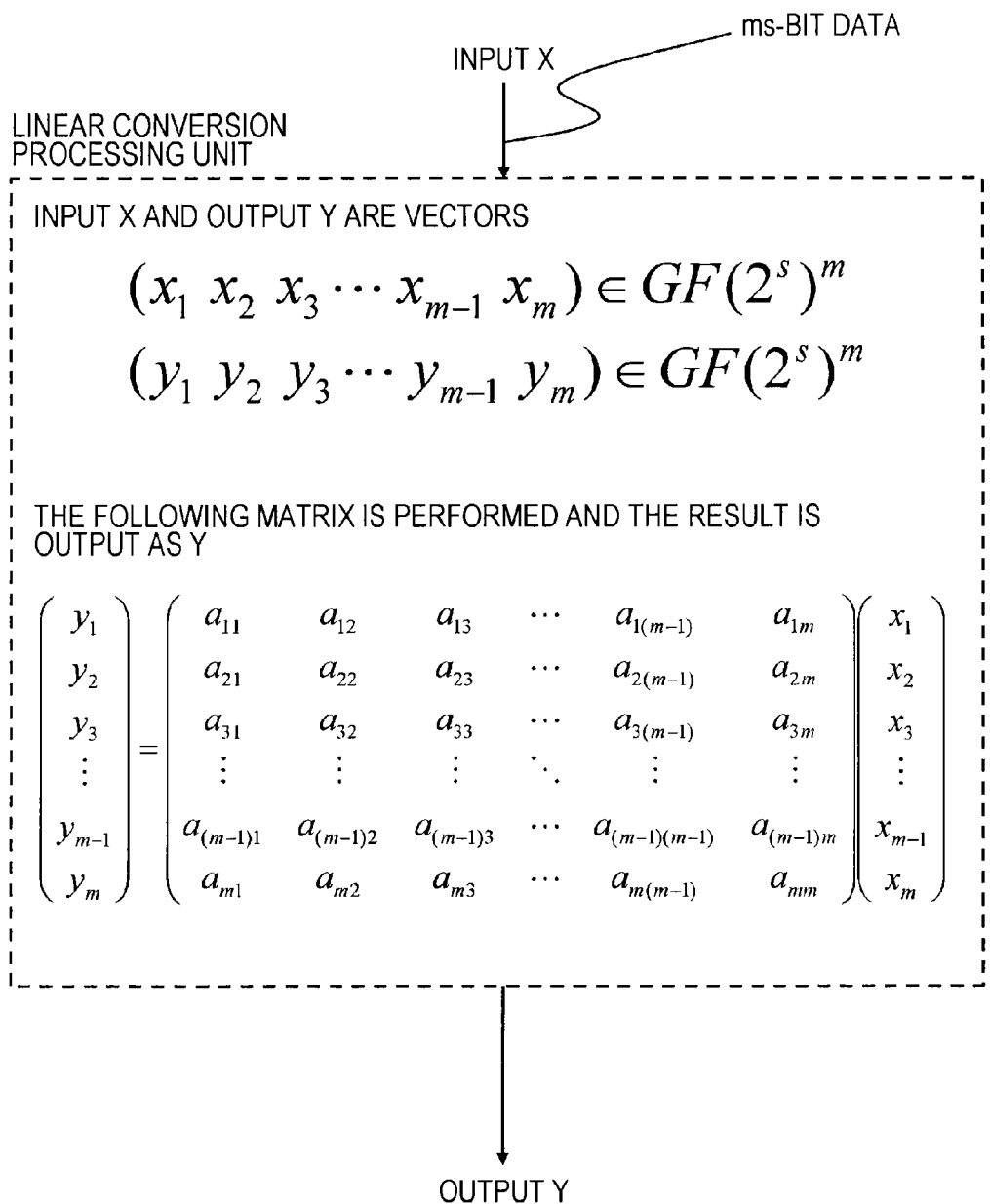
FIG. 10 is a diagram describing an example configuration of a linear conversion processing unit.

Linear conversion processing units can be defined as matrices considering their nature. The elements of the matrix can generally be expressed in various ways such as a body element of $GF(2^8)$ and an element of $GF(2)$. FIG. 10 illustrates an example of a linear conversion processing unit defined by a matrix of m×m, which defines the ms-bit input and output as $GF(2^s)$.

[2. S-boxes]

First, an overview of S-boxes as non-linear conversion units will be described before the description of the configuration according to the present invention.

The non-linear conversion processing executed in the F function is performed, for example, applying a non-linear conversion function called an S-box. This S-box is a configuration element of block ciphers and hash functions, and is an extremely important function for determining the level of security and implementation performance.

Generally, this S-box is a non-linear conversion function has an n-bit input and an m-bit output, but the description will continue hereafter discussing a bijective S-box with an n-bit input and output. Here, bijective means that all output values are mapped from one input value.

(Security Perspective)

The nature of the S-box imparts a significant influence on the level of security for the overall encryption. An exact evaluation of the level of security regarding the overall encryption and round function itself is generally difficult as the size of the input and output is significant, but an exact evaluation is possible as the input and output size of the S-box is generally smaller (input and output of approximately eight bits). In order to increase the level of security of the overall encryption, at least the following properties (1) through (4) are desirable in the S-box.

(Property 1) The Maximum Difference Probability Must be Sufficiently Small

When an input variable x is uniformly selected regarding an arbitrary input difference $\Delta x$ and an output difference $\Delta y$, the difference probability of the S-box is the probability which satisfies $S(x)+S(x+\Delta x)=\Delta y$.

However, $S(x)$ represents the output corresponding to an input x for some S-box S.

The maximum difference probability is defined as the highest probability from the combinations of all input and output differences. Each will be defined below with Expressions.

If the difference probability of a function S when provided with the input difference $\Delta x$ and the output difference $\Delta y$ is defined as $DPs(\Delta x, \Delta y)$, then $DPs(\Delta x, \Delta y)$ is defined as follows.

[Math. 1]

$$DP_S(\Delta x, \Delta y) = \frac{\#\{x \in \{0,1\}^n \mid S(x) \oplus S(x \oplus \Delta x) = \Delta y\}}{2^n} \quad (1)$$

where $\oplus$ represents the XOR in increments of bits.

At this time, the maximum difference probability MDPs for the function is defined as follows.

[Math. 2]
$$MDP_S = \max_{\Delta x \neq 0, \Delta y} DP_S(\Delta x, \Delta y) \quad (2)$$

This difference probability can have resistance against difference attacks by designing a sufficiently small S-box.

(Property 2) the Maximum Linear Probability Must be Sufficiently Small

When the input variable x is uniformly selected regarding an arbitrary input mask $\Gamma x$ and an output mask $\Gamma y$, the S-box linear probability is the value obtained from the probability that satisfies $$\Gamma x \cdot x = \Gamma y \cdot S(x) \quad (2).$$

Here, · means the internal multiplication between the n-bit vectors.

The maximum linear probability is defined as the highest probability from the combination of all input and output masks.

The following defines each of these as an expression.
If the linear probability of the function S when provided the input mask $\Gamma x$ and
the output mask $\Gamma y$
are defined as $LP_S(\Gamma x, \Gamma y)$,
then $LP_S(\Gamma x, \Gamma y)$ can be expressed as follows.

[Math. 3]
$$LP_S(\Gamma x, \Gamma y) = \left( \frac{\#\{x \in \{0, 1\}^n \mid x \cdot \Gamma(x) = S(x) \cdot \Gamma y\}}{2^n} - 1 \right)^2 \quad (3)$$

Here, the maximum difference probability MLPs for the function S is defined as follows.

[Math. 4]
$$MLP_S = \max_{\Gamma x, \Gamma y \neq 0} LP_S(\Gamma x, \Gamma y) \quad (4)$$

This maximum linear probability can have a resistance against linear attacks by designing a sufficiently small S-box.

(Property 3) The Boolean Algebra Degree Must be Sufficiently Large when Performing a Boolean Polynomial Expression.

The Boolean algebra degree means the degree when expressing the S-box output bits as Boolean input bits. By designing an S-box with a sufficiently high Boolean algebra degree regarding all bits, it is possible to have resistance against attacks using the algebraic nature of higher differential attacks or similar.

(Property 4) The Number of Terms Must be Sufficiently Large when Performing a Polynomial Expression on the Input and Output.

By sufficiently increasing the number of terms when performing polynomial expressions of the S-box output bits with the input bits, it is possible to have resistance against interpolation attacks.

(Implementation Perspective)

Besides a requirement for a level of security, S-boxes are required to have high implementation performance. Software implementations are normally implemented by a technique called table lookup (table implementation), and so this implementation performance is not particularly dependent on the internal structure of the S-box. However, the implementation performance is significantly affected by the internal structure of the S-box for hardware implementations. Thus, the internal structure of the S-box can be particularly important for hardware implementation capabilities.

(Problems with the Technology According to the Related Art)

As a technique for efficiently generating an S-box satisfying these requirements, a method using an exponential function regarding the extension field is well known. If the multiplier for the exponent and the degree for the extension field are suitably selected by this technique, an S-box with exceptionally advantageous properties can be generated.

When the actual n-bit input and output of the S-box is based on $GF(2^n)$ with x as the input and y as the output, this may be expressed as follows.

$$y = f(x) \text{ is either } y = X^{2^t+1} \text{ or } y = x^{-1} \quad \text{[Math. 5]}$$

When this is so provided,
it is well known that an S-box can be configured with an optimal maximum difference probability and a maximum linear probability (however, it is necessary to add a suitable affine transformation as the number of terms becomes small when using this technique to perform polynomial expressions on the input and output).

The S-boxes regarding AES (NPL 3: US National Institute of Standards and Technology Advanced Encryption Standard, Federal Information Processing Standards Publications No. 197, 2001.) and Camellia (NPL 4: Aoki, Ichikawa, Kanda, Matsui, Moriai, Nakajima, Tokita, "128-bit Block Encryption Camellia Algorithm Specification", Version 2.0, 2001.) serves as examples of the S-box configured by this kind of technique.

As the S-box can be configured as an inverse function of $GF((2^4)^2)$, properties from a security perspective are extremely advantageous, which enables the S-box of AES and Camellia to have even more so an extremely high hardware implementation performance.

However, recently problems such as attacks using this characteristic algebraic nature regarding this kind of S-box and problems related to this overly homogenous diffusivity have been identified.

A configuration method for S-boxes which do not have a characteristically algebraic nature has been conceived from these problems, and a method has been conceived to generate S-boxes randomly so as not to have a strong algebraic structure, or by a technique to select an element by a technique equivalent as such. If the S-box is generated by this kind of technique, in most cases there will be no characteristically algebraic structure, and there will also be no homogenous diffusion such as exponential functions regarding extensions fields, and so this can be said to be a countermeasure against the problems described beforehand.

However, as the number is S-box inputs and outputs of n bits is dependent on the factorial of $2^n$, it is difficult to actually generate the S-box with inputs and outputs of n bits randomly to efficiently generate an S-box with advantageous properties by somewhat increasing n with a technique such as checking these properties one by one.

Also, when elements are completely random, implementation efficiency decreases significantly as only techniques called table implementations can be mainly used for hardware implementations.

In light of this problem, there has been attempts to generate randomly generated S-boxes with input and output that are small in size, and combining a plurality thereof to generate a larger S-box.

For example, the S-boxes specified in CRYPTON Ver. 0.5 (NPL 5: Chae Hoon Lim, "CRYPTON: A New 128-bit Block Cipher-Specification and Analysis (Version 0.5)"), CRYPTON Ver. 1.0 (NPL 6: Chae Hoon Lim, "CRYPTON: A New 128-bit Block Cipher-Specification and Analysis (Version 1.0)"), Whirlpool (NPL 7: Paulo S. L. M Barreto, Vincent Rijmen "The WHIRLPOOL Hashing Function", 2003), FOX (NPL 8: Pascal Junod and Serge Vaudenay, "FOX: a New Family of Block Ciphers", 2004), and CLEFIA (NPL 9: Sony Corporation, "The 128-bit Blockcipher CLEFIA Algorithm Specification", Revision 1.0, 2007) can be considered as examples of S-boxes generated based on this kind of technique.

These structures are illustrated in FIG. 11 through FIG. 15. These structures have smaller table sizes and therefore lower hardware implementation costs when compared to a case in which large S-boxes are generated randomly as described beforehand.

Figure 11:
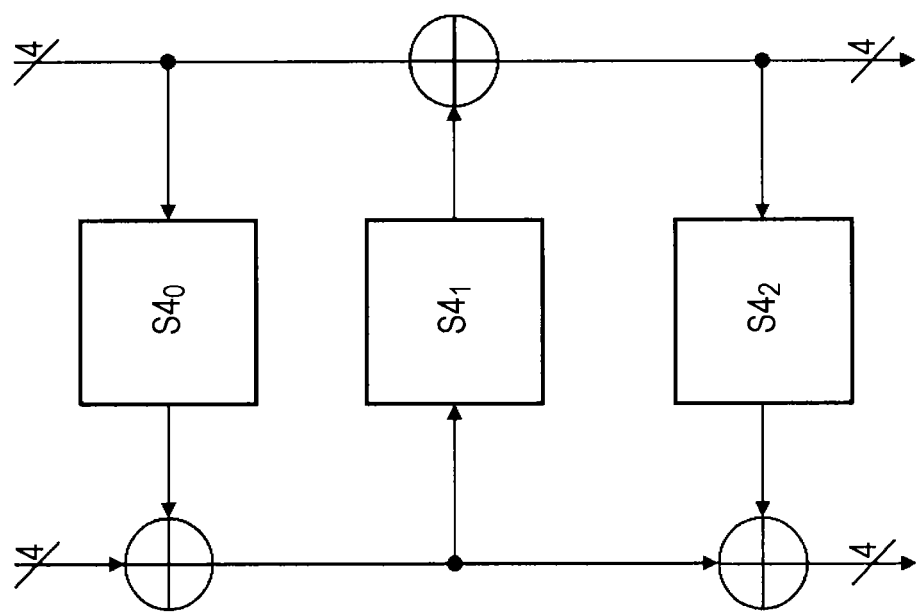
FIG. 11 is a diagram describing an example configuration for generating a large S-box by combining multiple units of S-boxes having small size input/output.

FIG. 11 is a configuration for executing non-linear conversion processing on 8-bit input data.

Each of three S-boxes for executing non-linear conversion processing using 4-bit data: $S4_0$, $S4_1$, and $S4_2$, includes three positional logical calculating units for executing XOR calculations on the four bits of output from each S-box and the other four bits.

The 8-bit input data are input into a left line input and a right line input every four bits.

The 8-bit data as the result of the non-linear conversion of the three S-boxes: $S4_0$, $S4_1$, and $S4_2$, are output from the left line output and the right line output every four bits.

The processing is executed according to the following processing sequence.

(1) Four bits of the eights bits of input (right line input) is input into the first round S-box: $S4_0$, and the non-linear conversion is executed.

An XOR calculation is performed on this non-linear conversion result and the other four bits from the eight bits of input (left line input).

(2) This XOR calculation result is input into the second round S-box: $S4_1$, and the non-linear conversion is executed.

An XOR calculation is performed on this non-linear conversion result and four bits from the eight bits of input (right line input).

The XOR calculation result is output as the four bits from the output of eight bits (right line output).

(3) Further, this XOR calculation result is input into the third round S-box: $S4_2$, and the non-linear conversion is executed.

An XOR calculation is performed on this non-linear conversion result and the XOR calculation result regarding the processing (1) described beforehand, and this result is output as four bits of the output of eight bits (Out-a).

FIG. 11 is a configuration for executing a non-linear conversion processing of 8-bit input data by the processing described beforehand.

Figure 12:
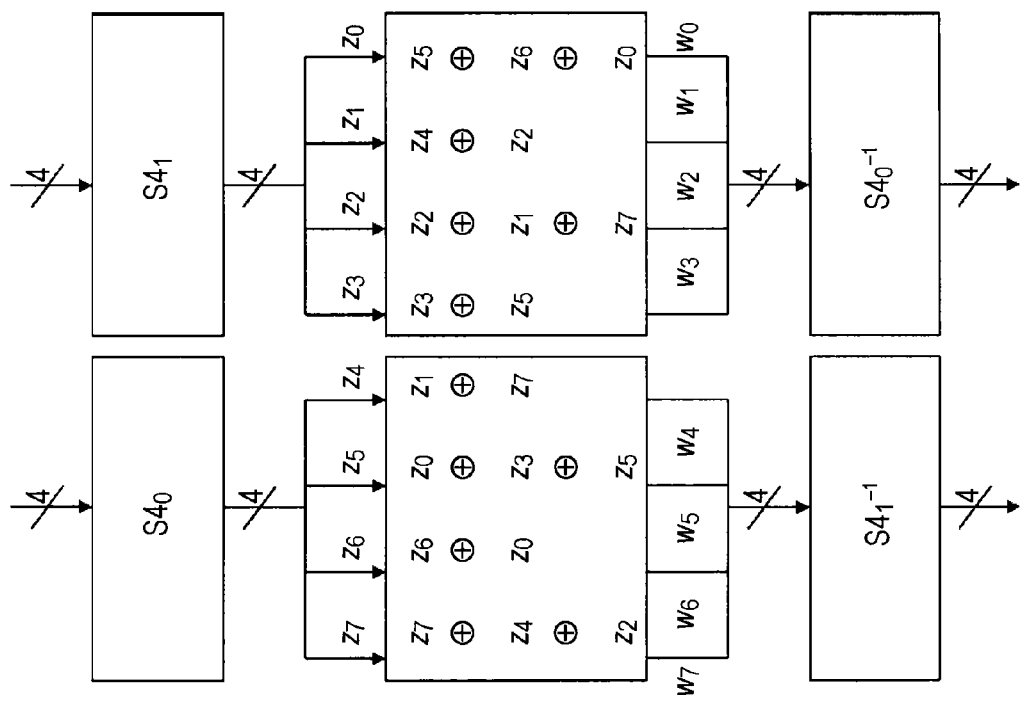
FIG. 12 is a diagram describing an example configuration for generating a large S-box by combining multiple units of S-boxes having small size input/output.

The configuration illustrated in FIG. 12 is configured from
S-boxes: $S4_0$ and $S4_1$ for executing non-linear conversion of 4-bit data,
a calculation executing unit for executing XOR calculations in units of two to three bits as to the 4-bit output from each S-box, and non-linear conversion units: $S4_1^{-1}$ and $S4_0^{-1}$ for executing an inverse calculation to the previous S-boxes: $S40$ and $S41$ as to the output from the calculation executing unit.

Figure 13:
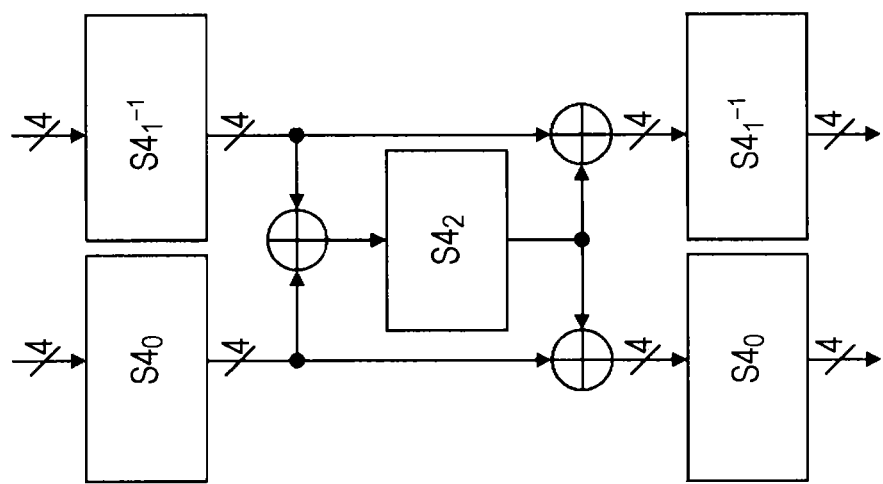
FIG. 13 is a diagram describing an example configuration for generating a large S-box by combining multiple units of S-boxes having small size input/output.

The configuration illustrated in FIG. 13 is a configuration of a non-linear conversion processing configured by a combination of
S-boxes: $S4_0$ and $S4_2$ for executing non-linear conversion of 4-bit data,
a non-linear conversion unit: $S4_1^{-1}$ for executing an inverse calculation to the S-box: $S4_1$,
and multiple XOR calculation units.

Figure 14:
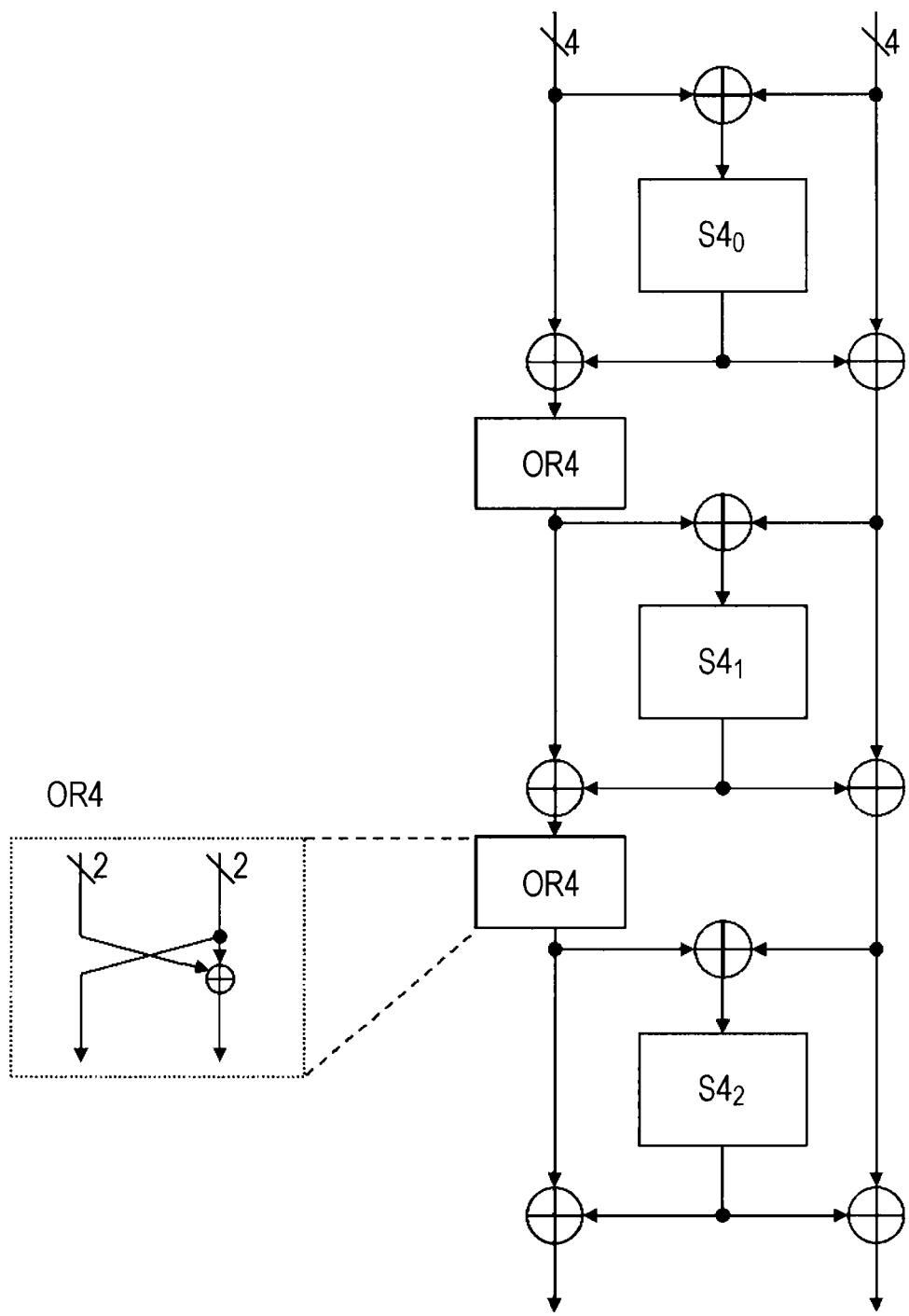
FIG. 14 is a diagram describing an example configuration for generating a large S-box by combining multiple units of S-boxes having small size input/output.

FIG. 14 is a configuration of a non-linear conversion processing configured by a combination of
S-boxes: $S4_0$, $S4_1$, and $S4_2$ for executing non-linear conversion of 4-bit data,
multiple XOR calculation units,
and multiple OR calculation units.

Figure 15:
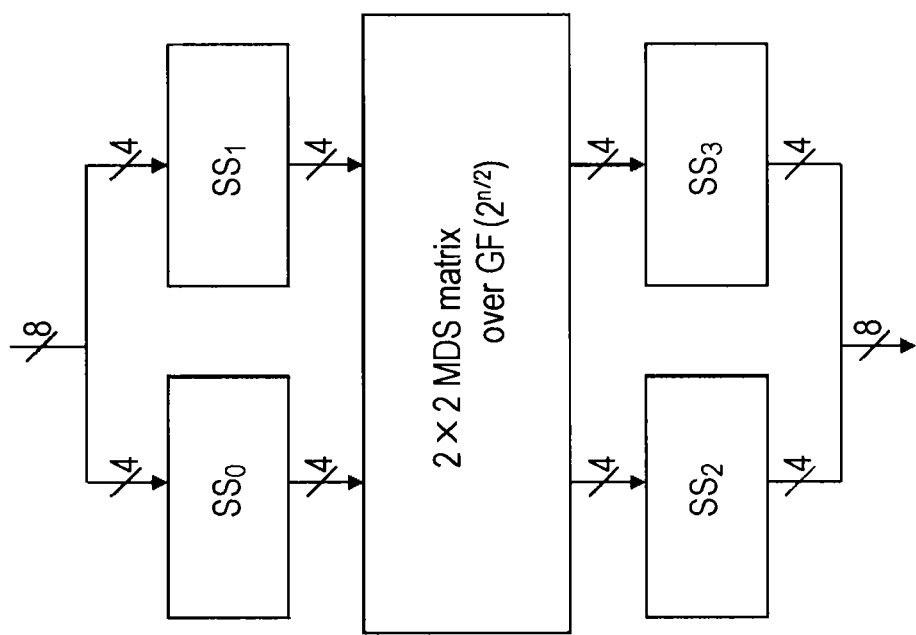
FIG. 15 is a diagram describing an example configuration for generating a large S-box by combining multiple units of S-boxes having small size input/output.

FIG. 15 is a configuration of a non-linear conversion processing configured by a combination of
S-boxes: $SS_0$, $SS_1$, $SS_2$, and $SS_3$ for executing non-linear conversion of 4-bit data,
and a matrix conversion executing unit for executing data conversion by applying a 2×2 matrix (MDS matrix).

In this way, several methods for configuring large S-boxes based on small S-boxes as illustrated in FIG. 11 through FIG. 15 have been proposed according to the related art. These kinds of configurations have smaller table sizes, and hardware implementation costs are decreased as compared to a case when generating large S-boxes randomly.

However, according to the configuration methods based on small S-boxes according to the related art in this way, there are problems regarding the method to design small S-boxes and the method for combining small S-boxes, as listed below.

(Problem 1) Regarding the Design of Small S-Boxes

According the methods of the related art, small S-boxes are created randomly. Thus, these small S-boxes require table implementations, and the circuit scale necessary for hardware implementations is still large.

(Problem 2) Regarding the Method to Combine Small S-Boxes

The methods according to the related art do not have simple repeating structures, and so circuit sharing is difficult even when executing the S-box over multiple cycles. When having a simple repeating structure, circuit sharing is possible, and there is a potential to minimize the necessary circuit scale despite the necessity for multiple cycles in practice. However, the merits of performing the implementation method in this way according to the related art are few, and it is difficult to reduce the circuit scale even when multiple cycles can be used.

[3. Overview of the S-box Related to the Present Disclosure]

With consideration of the problems described beforehand, hereafter, a method to configure the S-box to have a high level of security and to enable the reduction of the circuit scale when performing hardware implementations as compared to the related art is provided.

The configurations to be described hereafter produce a significant advantage particularly in cases in which a reduction in the necessary circuit scale for implementation is desired over actual throughput regarding hardware implementations. Further, for the sake of simplicity, the following descriptions will describe only bijective S-boxes with input and output of n bits.

The following two S-box configuration examples will be described in order.

(1) A method to configure the S-box in which implementation that is both secure and with a small circuit scale is possible by a repeating structure of logical calculations and bit replacements (2) A method to configure a large-size S-box having a repeating structure in which implementation that is both secure and with a small circuit scale is possible as based on small-size S-boxes Further, the (1) described beforehand is a configuration that can resolve the (Problem 1) described beforehand, and (2) is a configuration that can resolve the (Problem 2).

Combinations of (1) and (2) are also possible, and so it is possible to resolve both of the (Problems 1 and 2) by this combined configuration.

(3-1. S-box Configuration Method with Repeating Structure of Logical Calculations and Bit Replacements)

First, (1) a method to configure the S-box in which implementation that is both secure and with a small circuit scale is possible by a repeating structure of logical calculations and bit replacements will be described.

(3-1-1. Overview of S-box Configuration)

The S-box can be achieved by a combination of various logical circuits.

Here, the proposed S-box includes two parts, a "non-linear calculation unit" based on basic logical calculations such as AND (AND), OR (OR), and NOT (NOT), and a "bit replacement unit" for performing a shuffling of the bit positions, as the basic elements of the configuration of an S-box by repeating these elements.

The non-linear calculation unit uses one NAND (NAND) or NOR (NOR) calculation with a 2-bit input and 1-bit output, and one XOR (XOR) or XNOR (XNOR) calculation with a 2-bit input and 1-bit output to enable bijection and non-linear conversion, and includes a structure to calculate either an XOR or an XNOR on the result from performing either a NAND or an NOR calculation on arbitrary two bits as to one bit different from the two bits.

The bit replacement unit performs the simple shuffling of the bit positions.

The S-box is generated by multiple repetitions of this non-linear calculating unit and the bit replacement unit.

The non-linear calculating unit and the bit replacement unit may be changed at every repetition, or may use the same type of unit.

Generally, in order to configure a secure S-box of n bits, a repeating structure of n times should have the minimum configuration at which there is not a significant loss of security regarding this configuration method as repetitions for the non-linear calculation portion at least the n times is necessary. Also, it is possible to not execute and omit the final repetition of the bit replacement unit as this does not have any effect on the level of security and the circuit scale.

Further, the non-linear calculation unit is configured from either the NAND or the NOR calculation unit and either the XOR or the XNOR calculation unit as described beforehand, and so by mixing the XOR calculation units and the XNOR calculations units in the repeating structure for n times, it is possible to eliminate fixed points in the non-linear conversion processing. Therefore, it is desirable to implement a configuration in which the XOR calculation units and the XNOR calculation units are mixed in the repeating structure for n times of the non-linear calculation unit in order to achieve a non-linear conversion processing in which fixed points do not occur.

(3-1-2. Advantages of the Present Technique)

The advantages of the present technique including the following three advantages (Advantage 1 through 3). The first resolves the (Problem 1) of the existing technology, and the remaining two are additional advantages of the present invention.

(Advantage 1) Implementation is Possible with Smaller Circuits than the Methods According to the Related Art.

One non-linear calculation unit is configured only by either one NAND or NOR calculation and either one XOR or XNOR calculation.

Even among basic logic calculations performing nonlinear processing on input, NAND/NOR calculations are known to be able to be implemented with a small circuit.

Besides the NAND/NOR calculation, only the XOR/XNOR calculation is used to secure the bijective properties. Thus, this non-linear calculation portion can be said to be the minimum class among bijective non-linear functions for the implementation cost of hardware (necessary circuit scale).

Further, the bit replacement unit can be implemented by only changing wirings regarding hardware implementations, and does not have any effect on the necessary circuit scale. That is to say, the hardware implementation cost (necessary circuit scale) is zero.

With the present configuration, the circuits necessary for implementation can be significantly reduced as compared to the methods according to the related art as it is configured with repetitions of this non-linear calculation unit and bit replacement unit.

(Advantage 2) The Hardware Implementation Cost can be Accurately Estimated.

According to the methods of the related art, the S-box is generated randomly, and so it was always necessary to evaluate using logical combination tools and such when estimating the necessary circuit scale.

Regarding the present configuration method, by evaluating the number of logical operators, that is to say, the number of repetitions, the hardware implementation cost (necessary circuit scale) can be easily estimated without using logical combination tools and such. According to the related art, it was difficult to find the optimum S-box from many as the estimation of the necessary circuit scale required much time, but according to the present configuration, it has been made easy to select the optimum S-box as the circuit scale can be easily estimated.

(Advantage 3) It is Possible to Configure Multiple Types of S-Boxes at the Same Hardware Implementation Cost (Necessary Circuit Scale).

There is freedom in selecting the logical operation used in the non-linear calculating unit and the type of bit replacement used in the bit replacement unit, and the type may be different for each repetition, and so multiple S-boxes can be configured at the same necessary circuit scale.

This contributes to the enabling of the selection of optimum combinations of high order functions and other functions from S-boxes with the same hardware implementation cost (necessary circuit scale).

(3-1-3. Specific Configuration Examples)

Next, specific configuration examples of the S-box by a repeating structure of logical calculations and bit replacements will be described.

Figure 16:
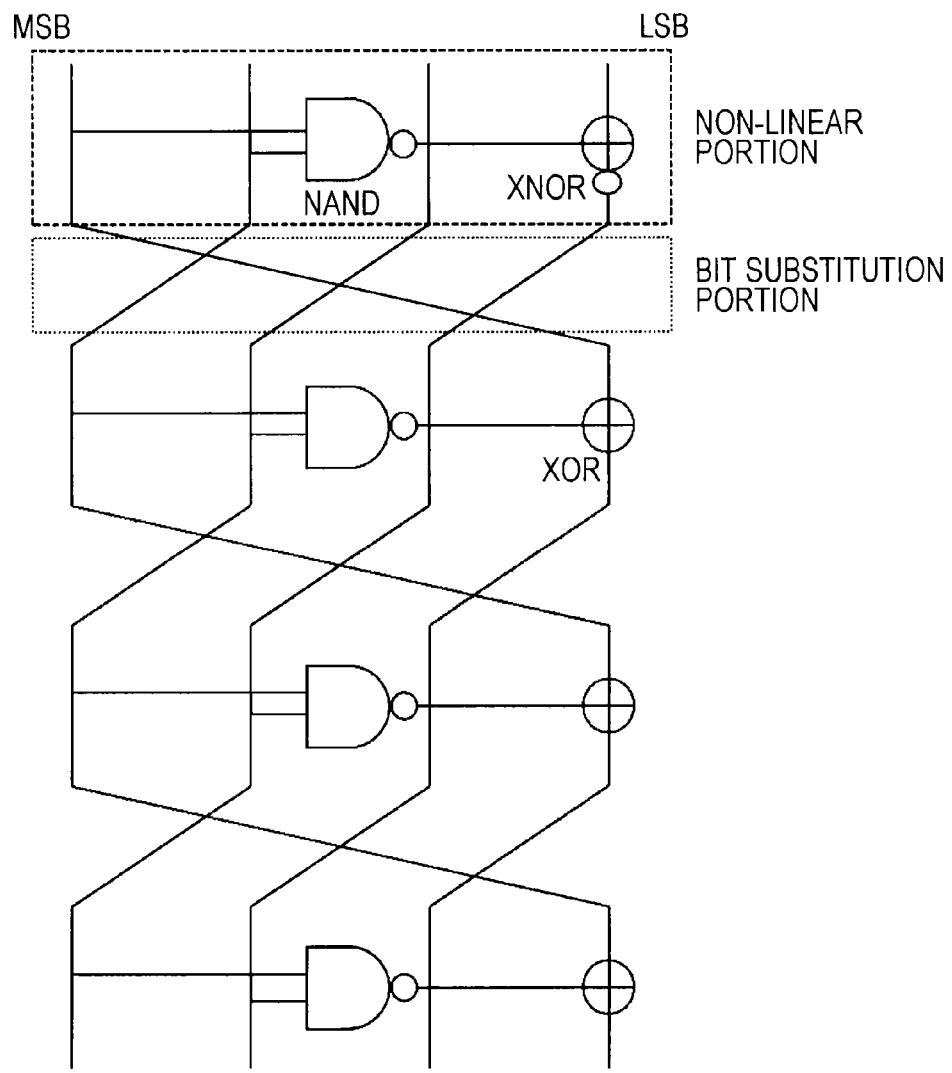
FIG. 16 is a diagram describing an example configuration of a 4-bit S-box from a repeating structure of a logical calculation and a bit replacement.

FIG. 16 illustrates a specific configuration example of the S-box of four bits.

The 4-bit S-box illustrated in FIG. 16 includes a 4-round repeating structure as a combination of the non-linear calculation unit and the bit replacement unit, and the non-linear calculation unit is configured from four NANDs, three XORs, and one XNOR. Further, the final round bit replacement is omitted from the figure as it is possible to have a configuration which sets the final round bit replacement, or to have a configuration in which this is omitted.

The non-linear calculation unit for the first round is configured with a NAND and an XNOR.

Two bits from the four bits of input are input into the NAND for the first round, these output bits are input into the XNOR for the first round, and the XNOR calculation is executed with one bit from the four bits of input.

The execution result for the XNOR calculation for the first round is set as the output bits and then input into the NAND for the non-linear portions of the third and fourth rounds.

The non-linear calculation unit for the second round is configured with a NAND and an XOR.

Two bits from the four bits of input are input into the NAND for the second round, these output bits are input into the XOR for the second round, and the XOR calculation is executed with one bit from the four bits of input.

The execution result for the XOR calculation for the second round is set as the output bits and then input into the NAND for the non-linear portions of the fourth round.

The non-linear calculation unit for the third round is configured with a NAND and an XOR.

One bit from the four bits of input and the execution result from the XNOR calculation for the first round are input into the NAND for the third round, these output bits are input into the XOR for the third round, and the XOR calculation is executed with one bit from the four bits of input.

The execution result for the XOR calculation for the third round is set as the output bits.

The non-linear calculation unit for the fourth round is configured with a NAND and an XOR.

The execution result from the XNOR calculation for the first round and the execution result from the XOR calculation for the second round are input into the NAND for the fourth round, these output bits are input into the XOR for the fourth round, and the XOR calculation is executed with one bit from the four bits of input.

The execution result for the XOR calculation for the fourth round is set as the output bits.

The maximum difference probability and the maximum linear probability, which are the conditions for an S-box with a high level of security as described in the previous section [2. S-boxes], for this 4-bit S-box are both $2^{-2}$. This is the optimum value for this 4-bit S-box, and the hardware implementation cost is less than compared to the randomly generated 4-bit S-box.

Thus, this 4-bit S-box can be said to have superior hardware implementation performance and security.

Other specific examples of S-boxes configured with the same circuit scale (same number of repetitions) having the same optimum difference probability and linear probability are illustrated in FIG. 17 through FIG. 20. Further, the final round bit replacement is omitted from FIG. 16 through FIG. 20 as it is possible to have a configuration which sets the final round bit replacement, or to have a configuration in which this is omitted.

Figure 17:
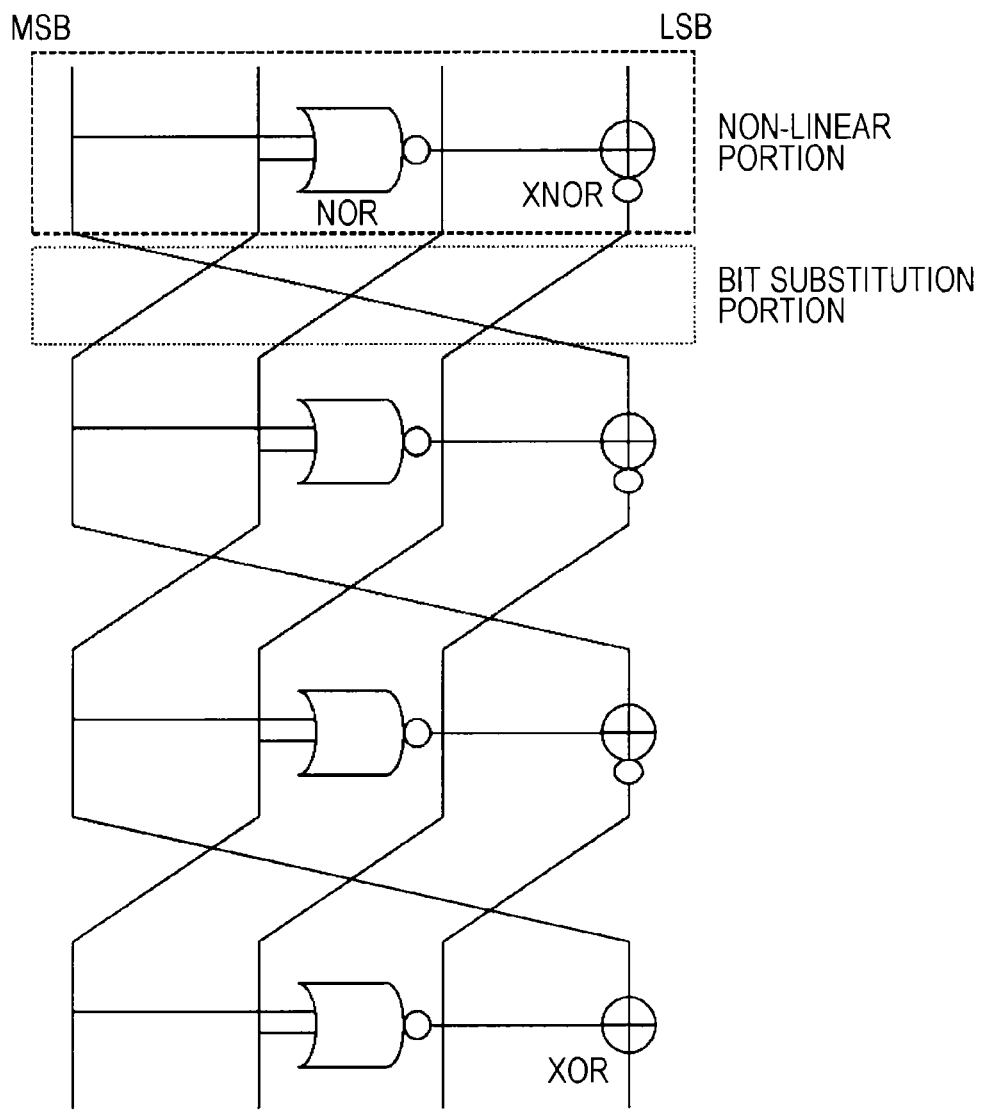
FIG. 17 is a diagram describing an example configuration of a 4-bit S-box from a repeating structure of a logical calculation and a bit replacement.

The 4-bit S-box illustrated in FIG. 17 is configured from four NORs, three XNORs, and one XOR.

Figure 18:
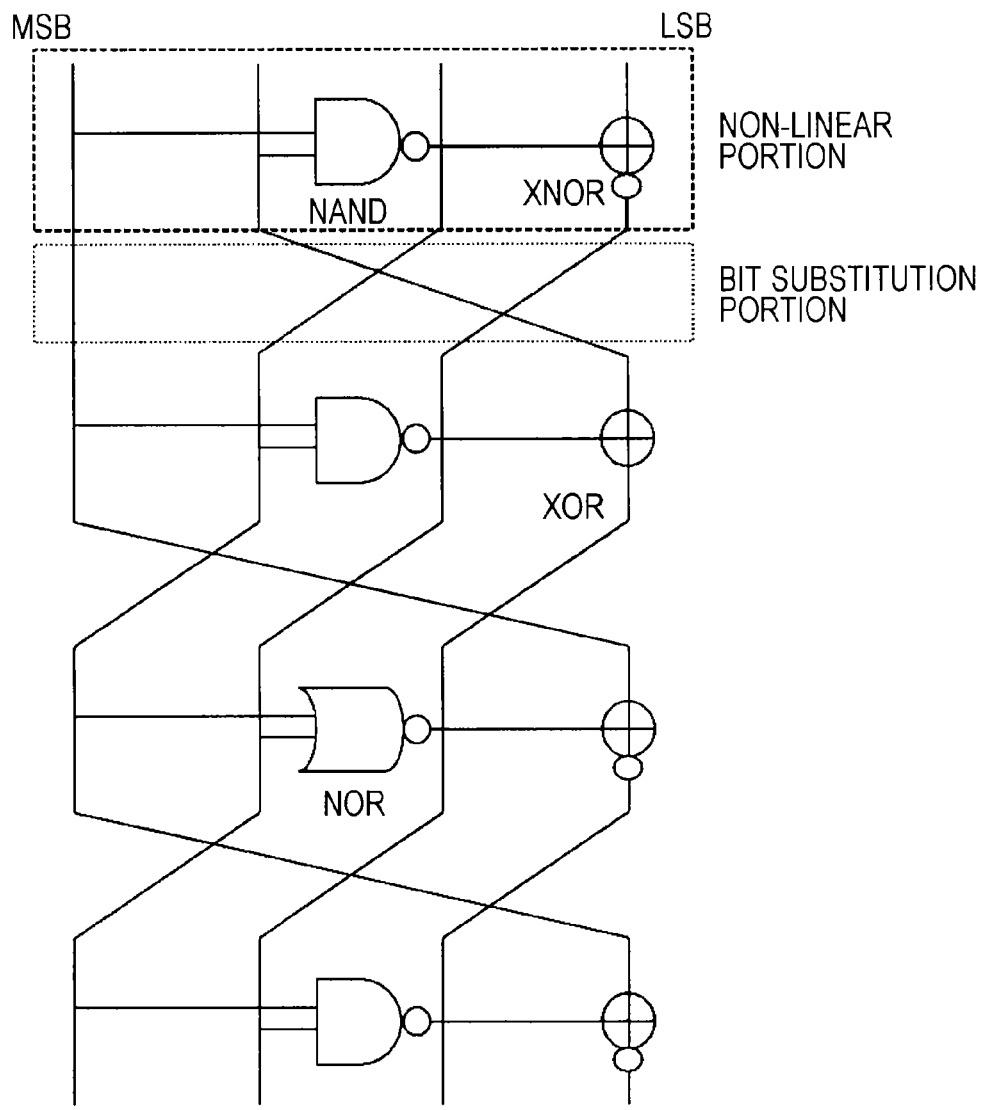
FIG. 18 is a diagram describing an example configuration of a 4-bit S-box from a repeating structure of a logical calculation and a bit replacement.

The 4-bit S-box illustrated in FIG. 18 is configured from three NANDs, one NOR, three XNORs, and one XOR.

Figure 19:
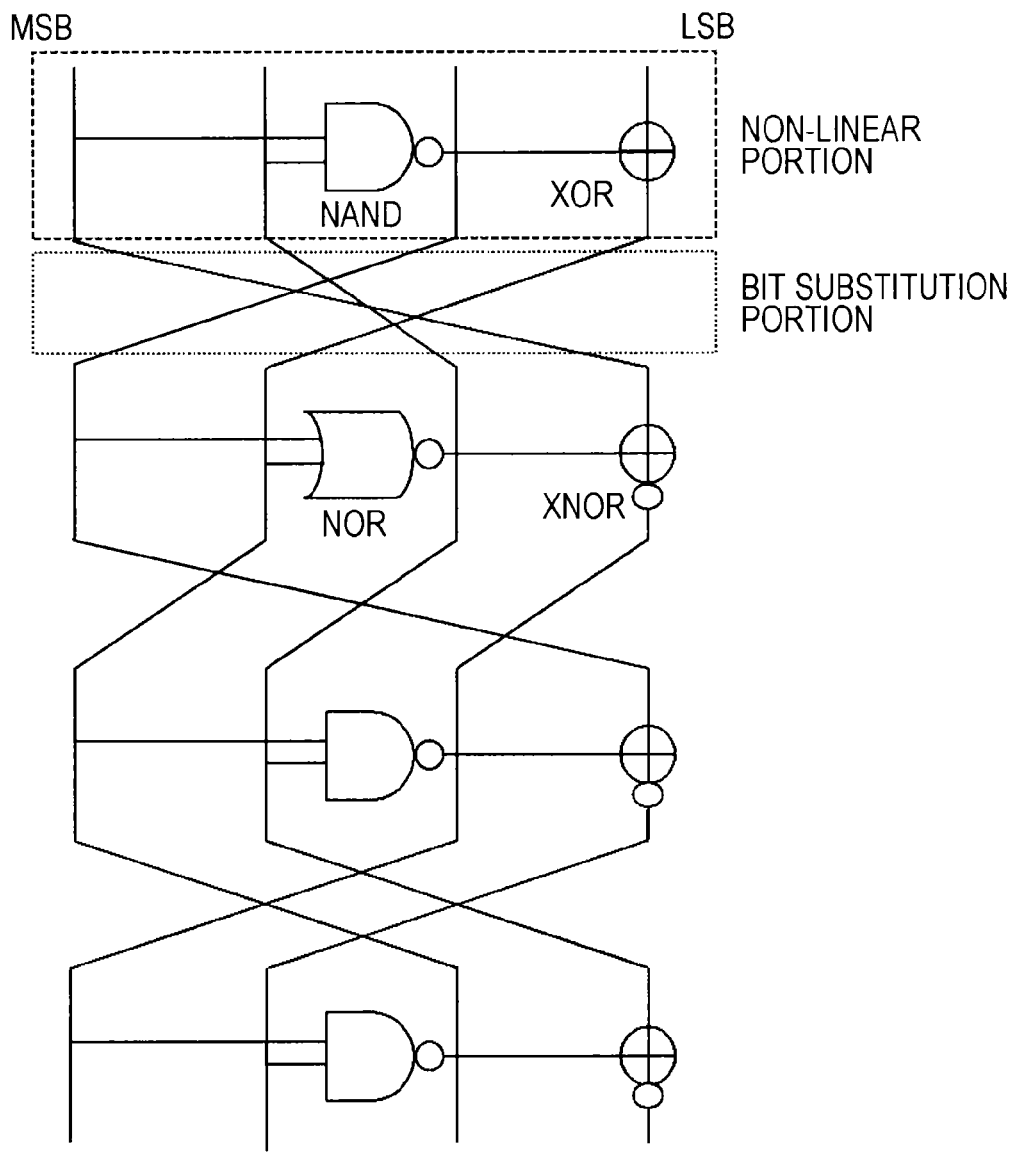
FIG. 19 is a diagram describing an example configuration of a 4-bit S-box from a repeating structure of a logical calculation and a bit replacement.

The 4-bit S-box illustrated in FIG. 19 is configured from three NANDs, one NOR, three XNORs, and one XOR.

Figure 20:
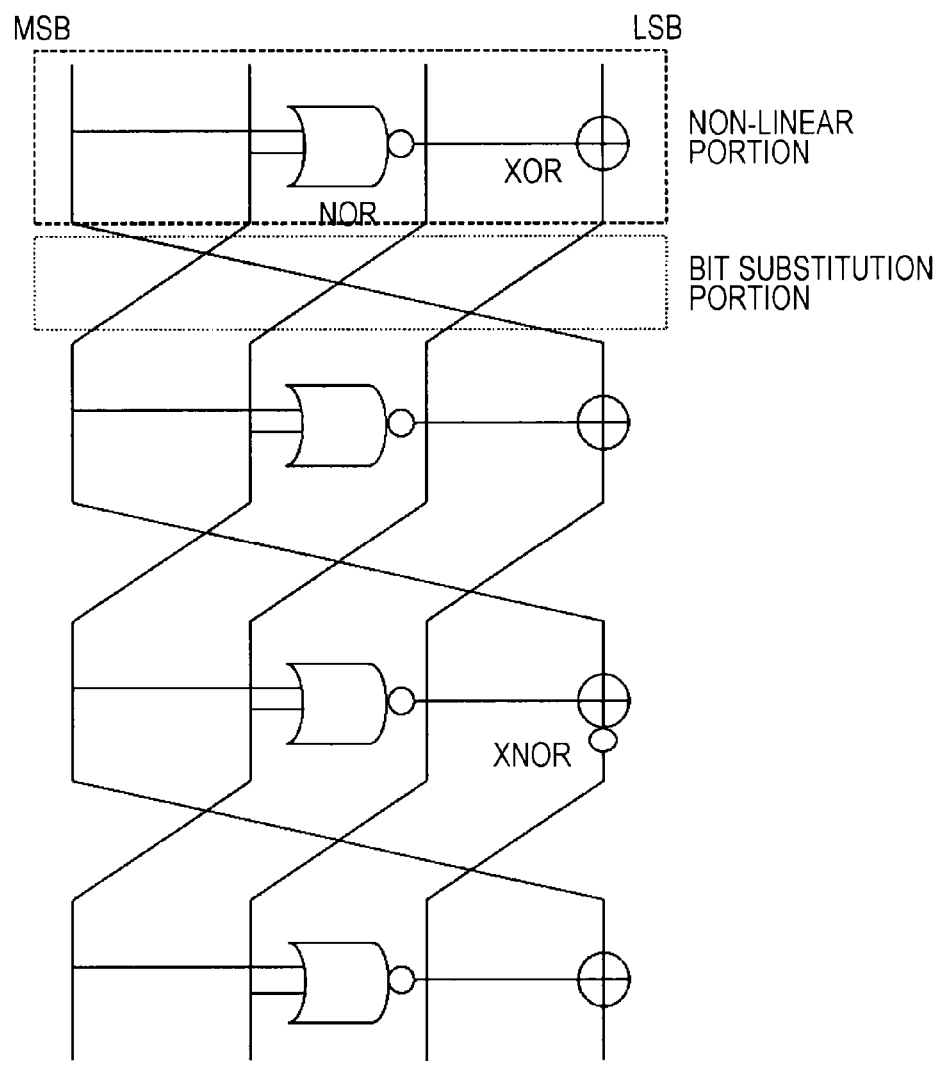
FIG. 20 is a diagram describing an example configuration of a 4-bit S-box from a repeating structure of a logical calculation and a bit replacement.

The 4-bit S-box illustrated in FIG. 20 is configured from four NORs, one XNOR, and three XORs.

The configuration and processing of the 4-bit S-box illustrated in each figure will be described.

The 4-bit S-box illustrated in FIG. 17 includes a 4-round repeating structure as a combination of the non-linear calculation unit and the bit replacement unit, and the non-linear calculation unit is configured from four NORs, three XNORs, and one XOR. Further, the final round bit replacement is omitted from the figure as it is possible to have a configuration which sets the final round bit replacement, or to have a configuration in which this is omitted.

The non-linear calculation unit for the first round is configured with a NOR and an XNOR.

Two bits from the four bits of input are input into the NOR for the first round, these output bits are input into the XNOR for the first round, and the XNOR calculation is executed with one bit from the four bits of input.

The execution result for the XNOR calculation for the first round is set as the output bits and then input into the NOR for the non-linear portions of the third and fourth rounds.

The non-linear calculation unit for the second round is configured with a NOR and an XNOR.

Two bits from the four bits of input are input into the NOR for the second round, these output bits are input into the XNOR for the second round, and the XNOR calculation is executed with one bit from the four bits of input.

The execution result for the XNOR calculation for the second round is set as the output bits and then input into the NOR for the non-linear portions of the fourth round.

The non-linear calculation unit for the third round is configured with a NOR and an XNOR.

One bit from the four bits of input and the execution result from the XNOR calculation for the first round are input into the NOR for the third round, these output bits are input into the XNOR for the third round, and the XNOR calculation is executed with one bit from the four bits of input.

The execution result for the XNOR calculation for the third round is set as the output bits.

The non-linear calculation unit for the fourth round is configured with a NOR and an XOR.

The execution result from the XNOR calculation for the first round and the execution result from the XNOR calculation for the second round are input into the NOR for the fourth round, these output bits are input into the XOR for the fourth round, and the XOR calculation is executed with one bit from the four bits of input.

The execution result for the XOR calculation for the fourth round is set as the output bits.

The 4-bit S-box illustrated in FIG. 18 includes a 4-round repeating structure as a combination of the non-linear calculation unit and the bit replacement unit, and the non-linear calculation unit is configured from three NANDs, one NOR, three XNORs, and one XOR. Further, the final round bit replacement is omitted from the figure as it is possible to have a configuration which sets the final round bit replacement, or to have a configuration in which this is omitted.

The non-linear calculation unit for the first round is configured with a NAND and an XNOR.

Two bits from the four bits of input are input into the NAND for the first round, these output bits are input into the XNOR for the first round, and the XNOR calculation is executed with one bit from the four bits of input.

The execution result for the XNOR calculation for the first round is set as the output bits and then input into the NOR and NAND for the non-linear portions of the third and fourth rounds.

The non-linear calculation unit for the second round is configured with a NAND and an XOR.

Two bits from the four bits of input are input into the NAND for the second round, these output bits are input into the XOR for the second round, and the XOR calculation is executed with one bit from the four bits of input.

The execution result for the XOR calculation for the second round is set as the output bits and then input into the NAND for the non-linear portions of the fourth round.

The non-linear calculation unit for the third round is configured with a NOR and an XNOR.

One bit from the four bits of input and the execution result from the XNOR calculation for the first round are input into the NOR for the third round, these output bits are input into the XNOR for the third round, and the XNOR calculation is executed with one bit from the four bits of input.

The execution result for the XNOR calculation for the third round is set as the output bits.

The non-linear calculation unit for the fourth round is configured with a NAND and an XNOR.

The execution result from the XNOR calculation for the first round and the execution result from the XOR calculation for the second round are input into the NAND for the fourth round, these output bits are input into the XNOR for the fourth round, and the XNOR calculation is executed with one bit from the four bits of input.

The execution result for the XNOR calculation for the fourth round is set as the output bits.

The 4-bit S-box illustrated in FIG. 19 includes a 4-round repeating structure as a combination of the non-linear calculation unit and the bit replacement unit, and the non-linear calculation unit is configured from three NANDs, one NOR, three XNORs, and one XOR. Further, the final round bit replacement is omitted from the figure as it is possible to have a configuration which sets the final round bit replacement, or to have a configuration in which this is omitted.

The non-linear calculation unit for the first round is configured with a NAND and an XOR.

Two bits from the four bits of input are input into the NAND for the first round, these output bits are input into the XOR for the first round, and the XOR calculation is executed with one bit from the four bits of input.

The execution result for the XOR calculation for the first round is set as the output bits and then input into the NOR and the NAND for the non-linear portions of the second and third rounds.

The non-linear calculation unit for the second round is configured with a NOR and an XNOR.

One bit from the four bits of input and the execution result of the XOR for the first round are input into the NOR for the second round, these output bits are input into the XNOR for the second round, and the XNOR calculation is executed with one bit from the four bits of input.

The execution result for the XNOR calculation for the second round is set as the output bits and then input into the NAND for the non-linear portion of the fourth round.

The non-linear calculation unit for the third round is configured with a NAND and an XNOR.

One bit from the four bits of input and the execution result from the XNOR calculation for the first round are input into the NAND for the third round, these output bits are input into the XNOR for the third round, and the XNOR calculation is executed with one bit from the four bits of input.

The execution result for the XNOR calculation for the third round is set as the output bits.

The non-linear calculation unit for the fourth round is configured with a NAND and an XNOR.

The execution result from the XNOR calculation for the second round and the execution result from the XNOR calculation for the third round are input into the NAND for the fourth round, these output bits are input into the XNOR for the fourth round, and the XNOR calculation is executed with one bit from the four bits of input.

The execution result for the XNOR calculation for the fourth round is set as the output bits.

The 4-bit S-box illustrated in FIG. 20 includes a 4-round repeating structure as a combination of the non-linear calculation unit and the bit replacement unit, and the non-linear calculation unit is configured from four NORs, one XNOR, and three XORs. Further, the final round bit replacement is omitted from the figure as it is possible to have a configuration which sets the final round bit replacement, or to have a configuration in which this is omitted.

The non-linear calculation unit for the first round is configured with a NOR and an XOR.

Two bits from the four bits of input are input into the NOR for the first round, these output bits are input into the XOR for the first round, and the XOR calculation is executed with one bit from the four bits of input.

The execution result for the XOR calculation for the first round is set as the output bits and then input into the NOR for the non-linear portions of the third and fourth rounds.

The non-linear calculation unit for the second round is configured with a NOR and an XOR.

Two bits from the four bits of input are input into the NOR for the second round, these output bits are input into the XOR for the second round, and the XOR calculation is executed with one bit from the four bits of input.

The execution result for the XOR calculation for the second round is set as the output bits and then input into the NOR for the non-linear portions of the fourth round.

The non-linear calculation unit for the third round is configured with a NOR and an XNOR.

One bit from the four bits of input and the execution result from the XOR calculation for the first round are input into the NOR for the third round, these output bits are input into the XNOR for the third round, and the XNOR calculation is executed with one bit from the four bits of input.

The execution result for the XNOR calculation for the third round is set as the output bits.

The non-linear calculation unit for the fourth round is configured with a NOR and an XOR.

The execution result from the XOR calculation for the first round and the execution result from the XOR calculation for the second round are input into the NOR for the fourth round, these output bits are input into the XOR for the fourth round, and the XOR calculation is executed with one bit from the four bits of input.

The execution result for the XOR calculation for the fourth round is set as the output bits.

Also, regarding the 4-bit S-box which can be implemented at the same circuit scale as the 4-bit S-box illustrated in the examples described beforehand, there are four types of non-linear calculation unit calculations (=2×2), and 24 types of bit replacement unit bit replacements (=4!), and as the type can be different for each repetition, it is understood that there are 96 to the power of four possibilities.

That is to say, a great number of 4-bit S-boxes of the same circuit scale can be configured, so an optimal S-box for the purpose can be selected at the time of design.

Figure 21:
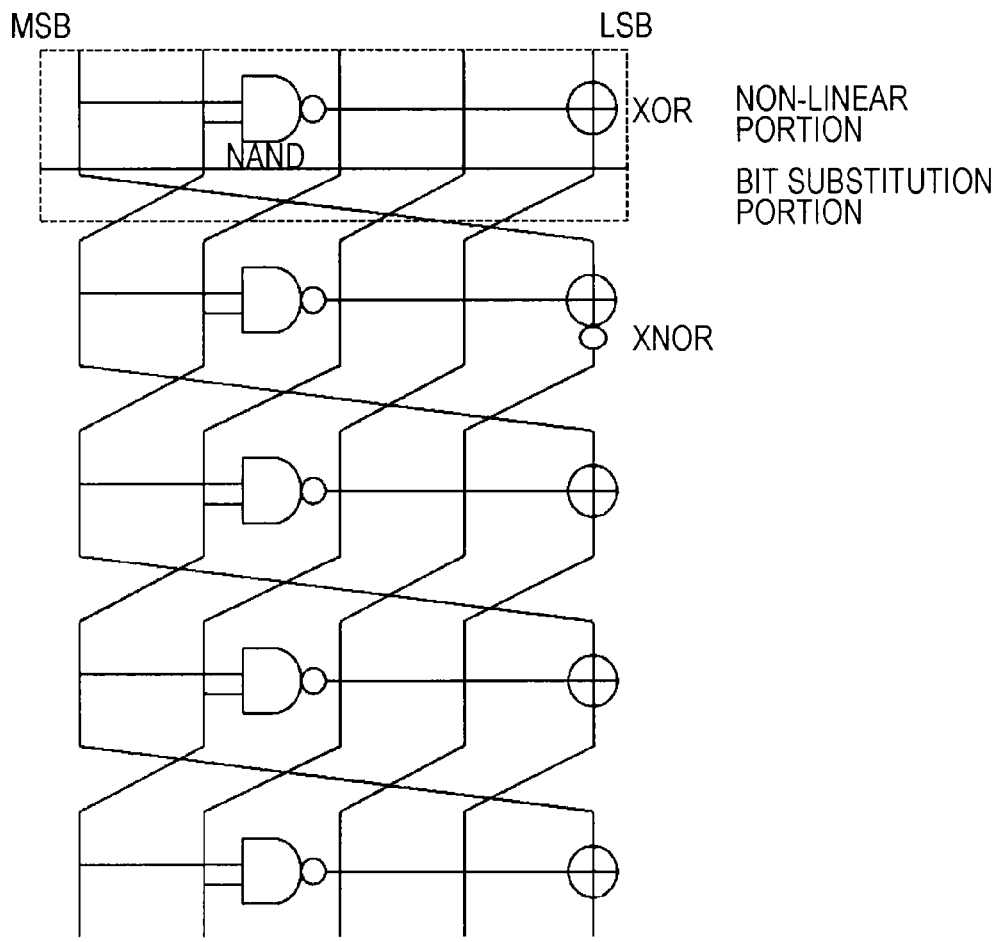
FIG. 21 is a diagram describing an example configuration of a 5-bit S-box from a repeating structure of a logical calculation and a bit replacement.

FIG. 21 illustrates an example configuration of a 5-bit S-box as another configuration example of the S-box.

The 5-bit S-box illustrated in FIG. 21 includes a 5-round repeating structure as a combination of the non-linear calculation unit and the bit replacement unit, and the non-linear calculation unit is configured from five NANDs, four XORS, and one XNOR. Further, the final round bit replacement is omitted from the figure as it is possible to have a configuration which sets the final round bit replacement, or to have a configuration in which this is omitted.

The non-linear calculation unit for the first round is configured with a NAND and an XOR.

Two bits from the five bits of input are input into the NAND for the first round, these output bits are input into the XOR for the first round, and the XOR calculation is executed with one bit from the five bits of input.

The execution result for the XOR calculation for the first round is set as the output bits and then input into the NAND for the non-linear portions of the fourth and fifth rounds.

The non-linear calculation unit for the second round is configured with a NAND and an XNOR.

Two bits from the five bits of input are input into the NAND for the second round, these output bits are input into the XNOR for the second round, and the XNOR calculation is executed with one bit from the five bits of input.

The execution result for the XNOR calculation for the second round is set as the output bits and then input into the NAND for the non-linear portion of the fifth round.

The non-linear calculation unit for the third round is configured with a NAND and an XOR.

Two bits from the five bits of input are input into the NAND for the third round, these output bits are input into the XOR for the third round, and the XOR calculation is executed with one bit from the five bits of input.

The execution result for the XOR calculation for the third round is set as the output bits.

The non-linear calculation unit for the fourth round is configured with a NAND and an XOR.

One bit from the five bits of input and the execution result from the XOR calculation for the first round are input into the NAND for the fourth round, these output bits are input into the XOR for the fourth round, and the XOR calculation is executed with one bit from the five bits of input.

The execution result for the XOR calculation for the fourth round is set as the output bits.

The non-linear calculation unit for the fifth round is configured with a NAND and an XOR.

The execution result from the XOR calculation for the first round and the execution result from the XNOR calculation for the second round are input into the NAND for the fifth round, these output bits are input into the XOR for the fifth round, and the XOR calculation is executed with one bit from the five bits of input.

The execution result for the XOR calculation for the fifth round is set as the output bits.

The difference probability and the linear probability for this 5-bit S-box is $2^{-2}$. As the optimum value for each portion of the 5-bit S-box is $2^{-4}$, this does not have the highest level of security, but the circuit scale is extremely smaller as compared to that which is generated randomly. For this reason, this can be applied in cases when implementation performance has priority.

(3-2. Method to Configure Large S-Boxes with a Repeating Structure Using Small S-Boxes)

Next, the method to configure large s-boxes with a repeating structure using small S-boxes will be described.

The configuration to configure a large S-box from a small S-box is configured as a repeating structure of a specific function. Specifically, a large S-box that has a comparatively low hardware implementation cost (necessary circuit scale) is first generated from a small S-box, and this large S-box includes a repeating structure. As a result, a large S-box having a repeating structure can be configured from a small S-box.

(3-2-2. Advantages of the Present Technique)

The present technique has significant advantages in hardware implementations, particularly implementations such as serial implementations with the aim to reduce the necessary circuit scale.

Regarding calculations having repeating structures, it is not necessary to implement all elements when implementing an S-box for a serial implementation, a unit of repetitions can be implemented, and this can be repeatedly executed for an arbitrary number of times.

Thus, this structure can be said to be implementable at a circuit scale smaller than the S-box according to the related art, which does not have a repeating structure.

(3-2-3. Specific Configuration Examples)

Next, specific configuration examples of the large S-box by a repeating processing using a small S-box will be described.

Hereafter, details on the specific configuration method will be described.

Further, the rectangular region illustrated as S in each drawing from FIG. 22 through FIG. 28 described hereafter is, for example, the small S-box described with reference to FIG. 16 to FIG. 21, that is to say, the S-box for executing a non-linear conversion processing in units of four bits, for example.

Each of the FIG. 22 through FIG. 28 has a configuration in which input of n bits is divided into four parts of n/4 bits that are input into four lines, a calculation processing is executed by a calculation executing unit made up from a small S-box and an XOR circuit as to the data from each line, and multiple rounds of rotations by a rotation (Rotation) executing unit are repeatedly executed in units of the data from each line.

Figure 22:
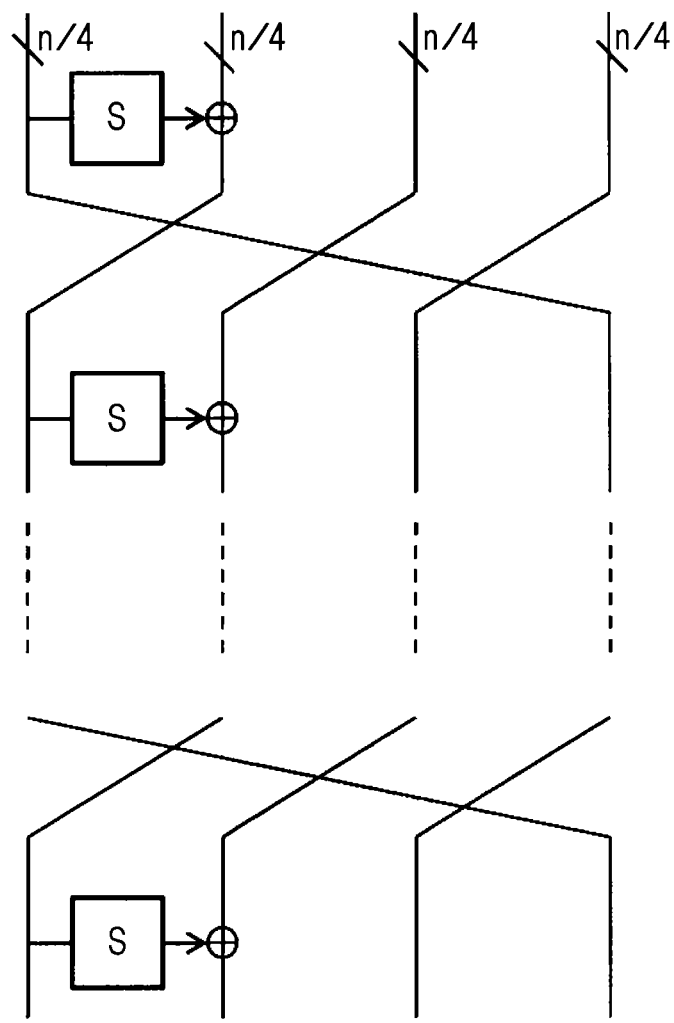
FIG. 22 is a diagram describing an example configuration of a large S-box from a repeating processing using a small S-box based on a type-I GFN (Generalized Feistel Network).

The configuration illustrated in FIG. 22 has configuration applying one S-box and one XOR circuit for each round, and has a configuration in which a result of applying the n/4-bit S-box and XOR circuit is generated in the preceding processing round, data rotations are performed in units of the n/4-bit lines as to the n/4-bit calculation result and the other unprocessed data, and the rotation result is output to the next processing round.

Figure 23:
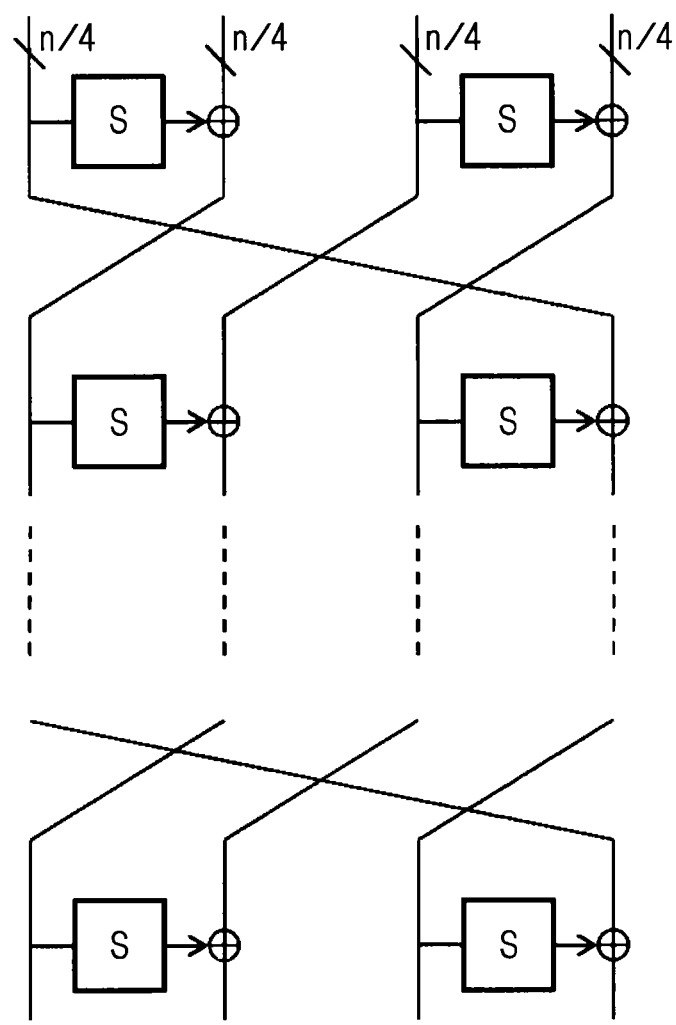
FIG. 23 is a diagram describing an example configuration of a large S-box from a repeating processing using a small S-box based on a type-II GFN.

The configuration in FIG. 23 has a configuration applying two S-boxes and two XOR circuits for each round, and has a configuration in which a result of applying the n/4-bit S-box and XOR circuit for the preceding processing round is generated as two lines worth of data (2×(n/4) bits), data rotations are performed in units of the n/4-bit lines as to the 2-line calculation result and the other two lines of unprocessed data, and the rotation result is output to the next processing round.

Figure 24:
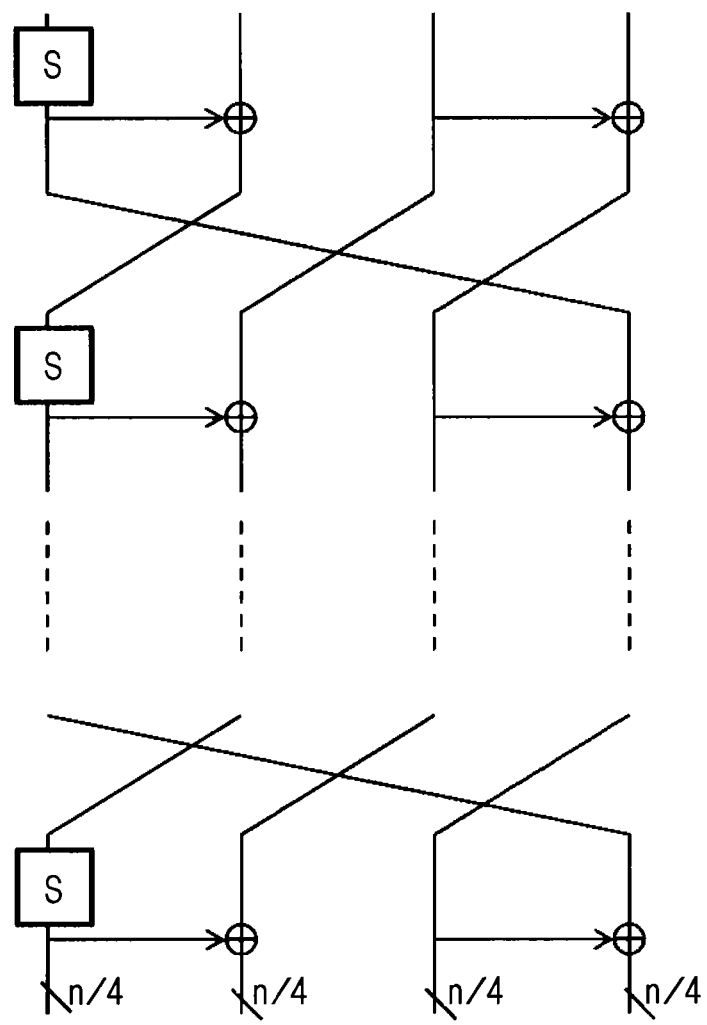
FIG. 24 is a diagram describing an example of applying a configuration of a large S-box from a repeating processing using a small S-box.

The configuration illustrated in FIG. 24 has a configuration applying one S-box and two XOR circuits for each round, and has a configuration in which regarding the preceding processing round, a result of applying the n/4-bit S-box, a result of applying the n/4-bit S-box and the XOR circuit, and a result of applying the n/4-bit XOR circuit are generated, data rotations are performed in units of the n/4-bit lines as to the three n/4-bit calculation results and the other unprocessed data, and the rotation results are output to the next processing round.

Figure 25:
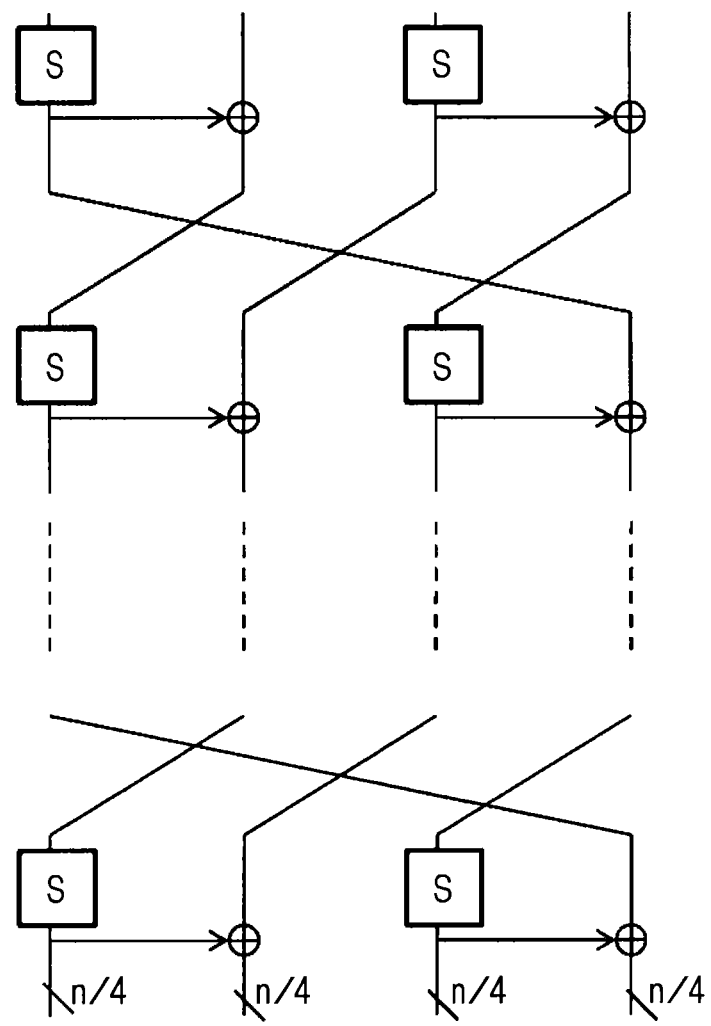
FIG. 25 is a diagram describing an example of applying a configuration of a large S-box from a repeating processing using a small S-box.

The configuration illustrated in FIG. 25 has a configuration applying two S-boxes and two XOR circuits for each round, and has a configuration in which regarding the preceding processing round, a result of applying the two n/4-bit S-boxes, and a result of applying the two n/4-bit S-boxes and the two XOR circuits, are generated, data rotations are performed in units of the n/4-bit lines as to the four n/4-bit calculation results, and the rotation results are output to the next processing round.

Figure 26:
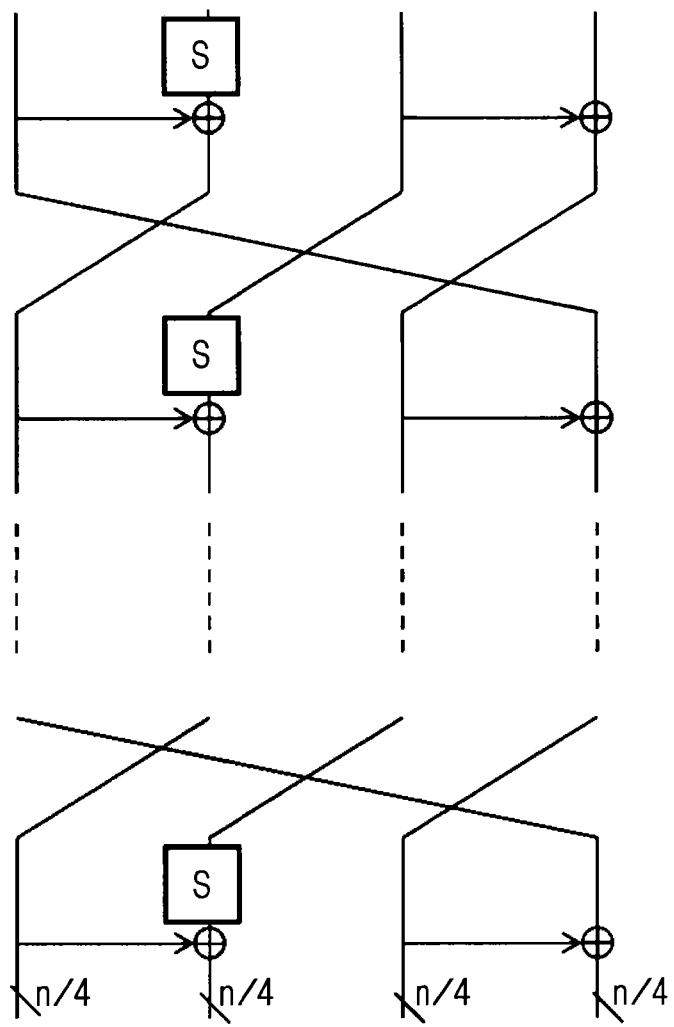
FIG. 26 is a diagram describing an example of applying a configuration of a large S-box from a repeating processing using a small S-box.

The configuration illustrated in FIG. 26 has a configuration applying one S-box and two XOR circuits for each round, and has a configuration in which regarding the preceding processing round, a result of applying the n/4-bit S-box and the XOR circuit, and a result of applying the n/4-bit XOR circuit, are generated, data rotations are performed in units of the n/4-bit lines as to the two n/4-bit calculation results and the other unprocessed data, and the rotation results are output to the next processing round.

Figure 27:
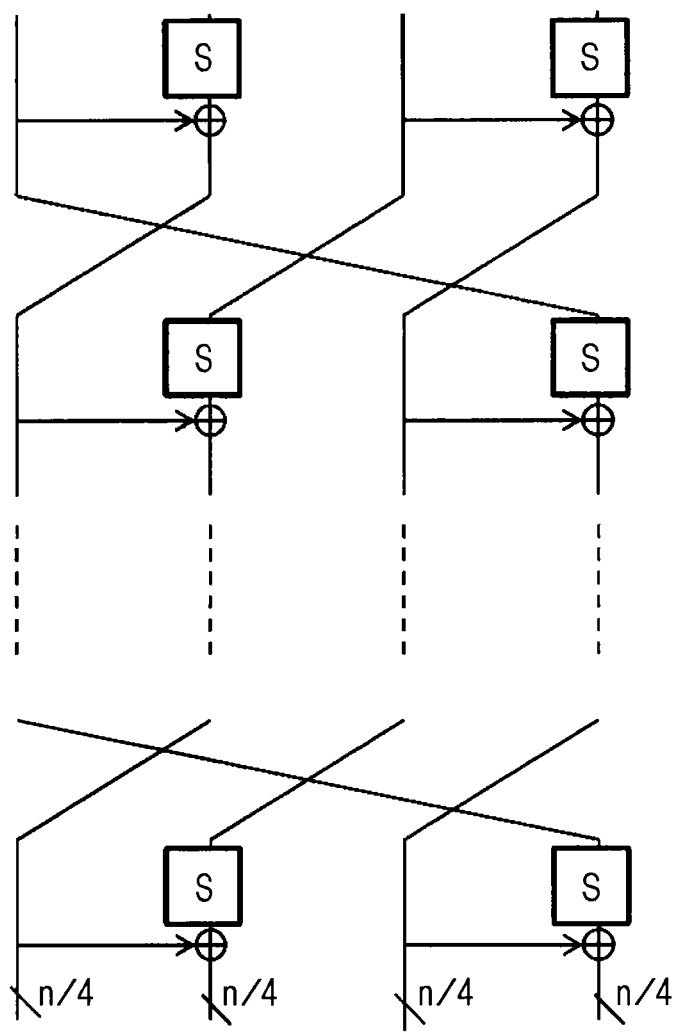
FIG. 27 is a diagram describing an example of applying a configuration of a large S-box from a repeating processing using a small S-box.

The configuration illustrated in FIG. 27 has a configuration applying two S-boxes and two XOR circuits for each round, and has a configuration in which regarding the preceding processing round, a result of applying the two n/4-bit S-boxes and the two XOR circuits, are generated, data rotations are performed in units of the n/4-bit lines as to the two n/4-bit calculation results and the other unprocessed data, and the rotation results are output to the next processing round.

Figure 28:
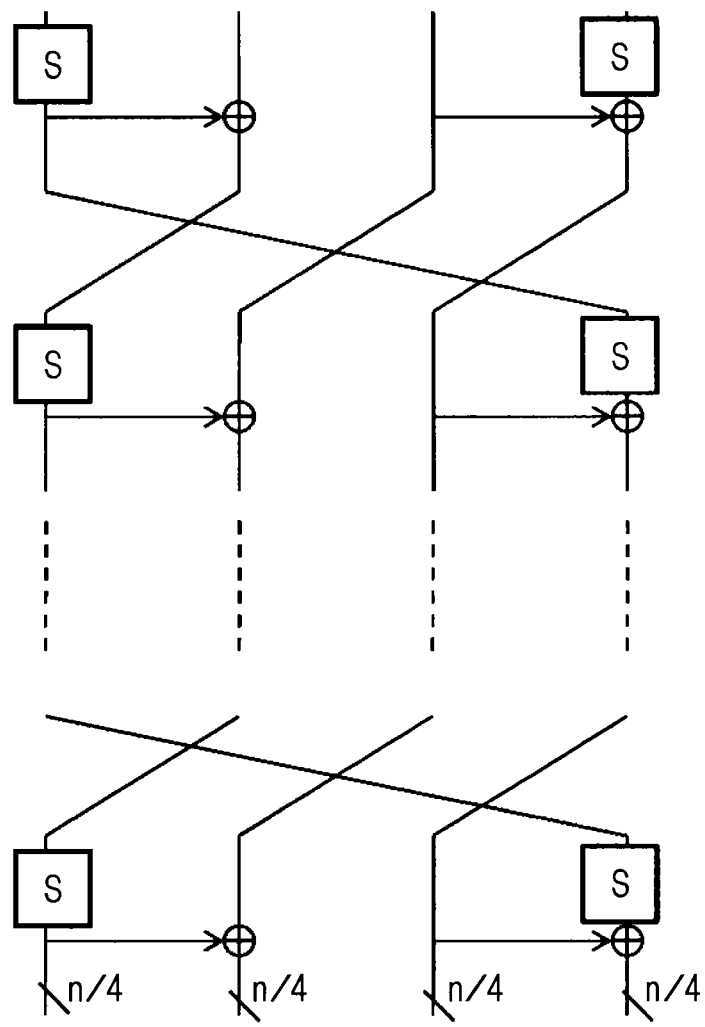
FIG. 28 is a diagram describing an example of applying a configuration of a large S-box from a repeating processing using a small S-box.

The configuration illustrated in FIG. 28 has a configuration applying two S-boxes and two XOR circuits for each round, and has a configuration in which regarding the preceding processing round, a result of applying the n/4-bit S-box, a result of applying the n/4-bit S-box and the XOR circuit, and a result of applying the n/4-bit XOR circuit are generated, data rotations are performed in units of the n/4-bit lines as to the three n/4-bit calculation results and the other unprocessed data, and the rotation results are output to the next processing round.

FIG. 22 and FIG. 23 are repeating structures called type-I GFN (Generalized Feistel Network) and type-II GFN, respectively.

Normally, these are used together with a secret key used in the small non-linear portion, but according to the present embodiment, a secret key is not implemented due to considerations of implementation efficiency.

By implementing a configuration not using a secret key in this way, it is possible to implement this entirely as one fixed table.

The difference between the configurations in FIG. 22 and FIG. 23 is the number of small S-boxes for each round.

The type-I GFN in FIG. 22 is configured from one n-bit S-box, one n-bit XOR, and the rotation in units of n bits.

According to the example illustrated in FIG. 22, the input data is n bits, divided into four parts, and input into each line in units of n/4 bits.

Further, the number of divisions of the input data is arbitrary. That is to say, extensions of an arbitrary r number of divisions (r>2) are possible, and this can be determined appropriately depending on the input and output size of the necessary, large S-box.

The type-II GFN illustrated in FIG. 23 is configured from two small n-bit S-boxes, two n-bit XORs, and the rotation in units of n bits, in increments of each round.

The features of these two configuration methods is that the calculations in the normal order are almost the same as the calculation in the reverse order, and the difference is only the in the rotation portion.

As a result, circuit sharing can be performed when it is necessary to implement both an ordered function and a reverse function. Regarding the configuration method as in FIG. 23, when generating a 16-bit S-box using the 4-bit S-box as in FIG. 16, the maximum difference probability for six repetitions is $2^{-8.3}$, and the maximum linear probability is $2^{-7.83}$, the maximum difference probability for seven repetitions is $2^{-9.1}$, and the maximum linear probability is $2^{-8}$.

These values are not the optimum values at 16 bits, but these probabilities are sufficiently low, and the circuit scale is extremely small as compared to that created randomly.

FIG. 24 through FIG. 28 are structures in which small S-boxes are arranged in portions different form that of the structures in FIG. 22 and FIG. 23. The differences between each of these are only the location of the arrangement and the number of S-boxes in the unit of repetitions.

According to these structures, the data input into the small S-boxes are unnecessary in subsequent calculations, and so excessive storage regions are unnecessary, which enables the necessary circuit scale in hardware to be reduced further when dividing and implementing the repeating function into even finer portions.

Regarding the configuration method as in FIG. 25, when configuring a 16-bit S-box using the 4-bit S-box as in FIG. 17, the maximum difference probability for six repetitions is $2^{-8.3}$, and the maximum linear probability is $2^{-8}$, the maximum difference probability for seven repetitions is $2^{-9.1}$, and the maximum linear probability is $2^{-8.5}$.

These values are not the optimum values at 16 bits, but these probabilities are sufficiently low, and the circuit scale is extremely small as compared to that created randomly.

[4. Configuration Examples of Encryption Processing Device]

Finally, actual examples of encryption processing devices executing an encryption processing in accordance with the previously described embodiments will be described.

The encryption processing devices for executing the encryption processing in accordance with the previously described embodiments can be installed in various information processing devices executing encryption processing. Specifically, this can be used regarding various crises in which encryption processing is executed along with data processing and communication processing by devices such as PCs, TVs, recorders, players, communication devices, RFIDs, smart cards, sensor network devices, battery/battery authentication modules, health and medical devices, independent network devices, etc.

Figure 29:
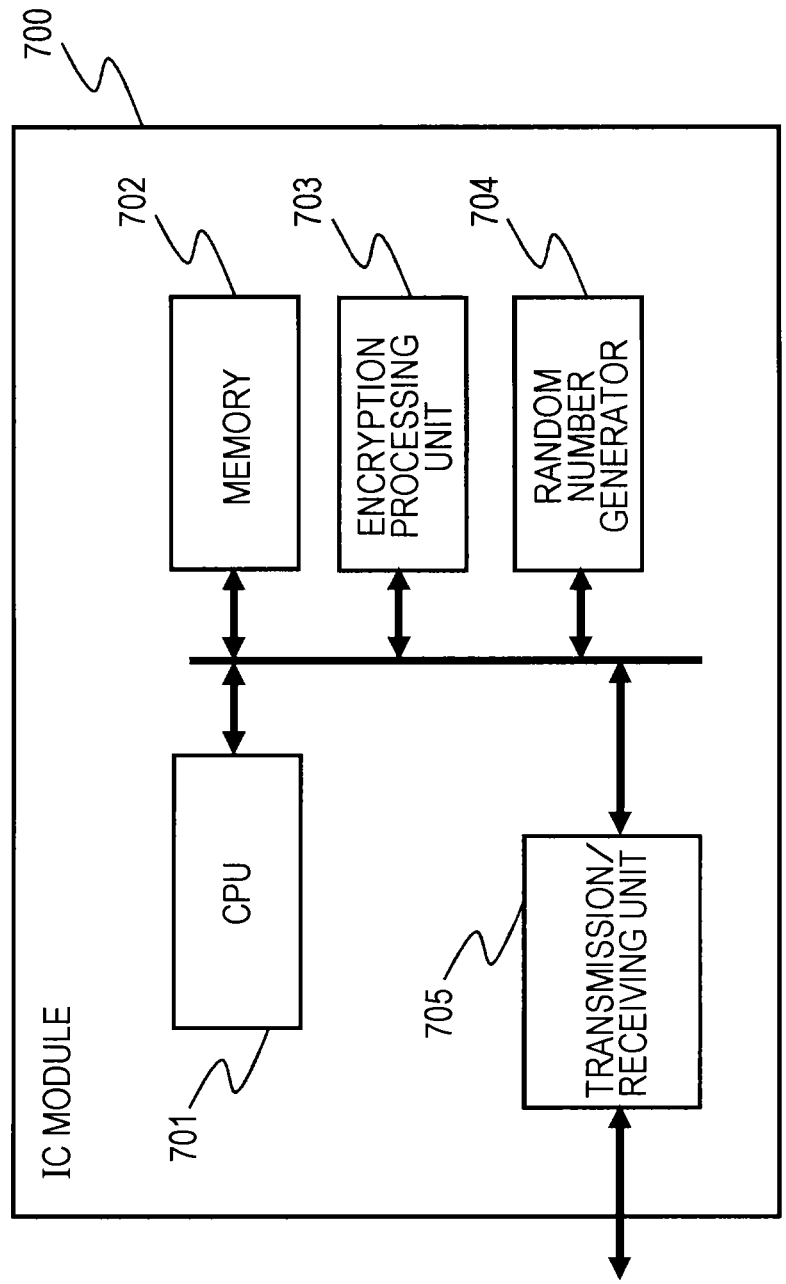
FIG. 29 is a diagram illustrating an example configuration of an IC module 700 as the encryption processing device.

FIG. 29 illustrates an example configuration of an IC module 700 as an example of a device executing the encryption processing according to the present disclosure. The previously described processing can be executed in various information processing devices such as PCs, IC cards, reader-writers, and others, and the IC module 700 illustrated in FIG. 29 can be configured in these various devices.

A CPU (Central Processing Unit) 701 illustrated in FIG. 29 is a processor executing various programs such as the starting and termination of the encryption processing, control of data transmission and reception, data transfer control between each configuration element, and others. A memory 702 is made up from ROM (Read Only Memory) storing fixed data such as the program executed by the CPU 701, calculation parameter, and so on, and RAM (Random Access Memory) used as a work region and storage area of the program executed regarding the processing of the CPU 701 and parameters that arbitrarily change during the processing of the program. Also, the memory 702 can be used as a storage region for data and such applied to conversion matrices and conversion tables (replacement tables) applied during the encryption processing, and for key data necessary during encryption processing. Further, the data storage region is desirably configured as memory having a tamper-resistant structure.

An encryption processing part 703 executes encryption processing and decryption processing in accordance with the shared key block encryption processing algorithm applying the previously described encryption processing configurations, that is to say for example, generalized Feistel structures or Feistel structures.

Further, examples illustrated here used encryption processing means as individual models, instead of provisioning these kinds of independent encryption processing modules, a configuration can be implemented in which an encryption processing program can be stored in ROM, for example, and the CPU 701 reads out and executes the program stored in ROM.

A random number generator 704 executes random number generation processing necessary during the generation of keys necessary during encryption processing.

A transmission/reception unit 705 is a data communication processing unit executing data communication with external devices, executes data communication with IC modules such as reader-writers, for example, and executes the output of ciphertext generated within the IC module, the input of data from external reader-writers and so on among others.

Further, the data processing device described in the previously described embodiments is not only applicable to encryption processing to encrypt plaintext as input data, but is also applicable to decryption processing to decode the ciphertext as input data back to plaintext.

Regarding both processing, the encryption processing and the decryption processing, a configuration of a nonlinear conversion unit having the configurations described in the previous embodiments can be applied.

[5. Conclusion of Configuration of the Present Disclosure]

Thus, embodiments of the present disclosure have been described in detail with reference to specific embodiments. However, it will be apparent to those skilled in the art that various modifications and substitutions of the embodiments may be made without departing from the scope and spirit of the present disclosure. That is to say, the present invention has been disclosed exemplarily by embodiments, and should not interpreted restrictively. The Claims should be referenced in order to determine the scope of the present disclosure.

Further, the technologies disclosed in the present specification can take the following configurations.

(1) A data processing device including:

a data conversion processing unit configured to divide and input configuration bits of data to be processed into a plurality of lines, and to repeatedly execute a data conversion processing as to the data in each line;

wherein the data conversion processing unit includes an F function executing unit configured to input one line of data configuring the plurality of lines, and to generated conversion data;

wherein the F function executing unit includes a non-linear conversion processing unit configured to execute a non-linear conversion processing;

and wherein the non-linear conversion processing unit includes a repeating structure of a non-linear calculation unit made up from either one NAND or NOR, and either one XOR or XNOR calculation unit, and a bit replacement unit.

(2) The data processing device according to (1), wherein the bit replacement unit includes a wiring configuration configured to shuffle the input and output bits corresponding to the non-linear calculation unit.

(3) The data processing device according to either (1) or (2), wherein the non-linear conversion processing unit outputs one bit of the calculation result from either the NAND or the NOR calculation unit with 2-bit input and 1-bit output to either the XOR or the XNOR calculation unit, executes either the XOR or the XNOR calculation with the other one bit of input data, and outputs the 1-bit data generated from the calculation result of either the XOR or the XNOR as the configuration bit as the non-linear conversion processing result.

The data processing device according to any one of (1) through (3), wherein the non-linear conversion processing unit includes a repeating structure in which the non-linear calculation unit is repeating at least an n number of times regarding the configuration to output the non-linear conversion result of n bits of data.

(5) The data processing device according to any one of (1) through (4), wherein the non-linear conversion processing unit is a configuration in which the non-linear calculation unit is set for an n number of times and the bit replacement unit is set for an n–1 number of times between the non-linear calculation unit for an n number of times regarding the configuration to output the non-linear conversion result of n bits of data.

(6) The data processing device according to any one of (1) through (5), wherein the non-linear conversion processing unit generates the calculation result for either the XOR or the XNOR calculation result from the calculation result of either the one NAND or the NOR calculation unit corresponding to all configuration bits of the data to be non-linearly converted, and outputs either the XOR or the XNOR calculation result as the configuration bit of the non-linear conversion result.

(7) The data processing device according to any one of (1) through (6), wherein the non-linear conversion processing unit is a configuration including both the XOR calculation unit and the XNOR calculation unit in the repeating structure.

(8) The data processing device according to any one of (1) through (7), wherein the data processing device executes encryption processing to convert plaintext as input data into ciphertext, and to execute decryption processing to convert ciphertext as input data into plaintext.

(9) A data processing device including a non-linear conversion processing unit having a repeating structure of:

a non-linear calculation unit made up from either one NAND or NOR calculation unit, and either one XOR or XNOR calculation unit; and a bit replacement unit.

(10) The data processing device according to (9), wherein the non-linear conversion processing unit generates the calculation result for either the XOR or the XNOR calculation result from the calculation result of either the one NAND or the NOR calculation unit corresponding to all configuration bits of the data to be non-linearly converted, and outputs either the XOR or the XNOR calculation result as the configuration bit of the non-linear conversion result.

(11) A data processing device including:

a repeating structure of a round function, which includes a non-linear function executing unit configured to divide and input configuration bits of data to be processed into a plurality of lines, and to input one line of data configuring the plurality of lines to generate the conversion data.

(12) The data processing device according to (11), wherein the non-linear function executing unit generates the calculation result for either the XOR or the XNOR calculation result from the calculation result of either the one NAND or the NOR calculation unit corresponding to all configuration bits of the data be non-linearly converted, and outputs either the XOR or the XNOR calculation result as the configuration bit of the non-linear conversion result.

Further, the processing method executed in the previously described device and system, and the program executing this processing is included in the configuration of the present disclosure.

Also, a portion of the processing described in this specification can be executed as hardware, software, or combination of the two. When executing this processing by software, a program to which the processing sequence is recorded is installed and executed in memory within a computer assembled with specialized hardware, or the program can be installed and executed in a general-purpose computer capable of executing the various processing. For example, the program can be recorded onto a recording medium beforehand. Other than installing to the computer from the recording medium, the program can be received via a network such as a LAN (Local Area Network) or the Internet, and can be installed to a recording medium such as an internal hard disk.

Further, the various processing disclosed in this specification can not only be executed temporally as according to the disclosure, but can also be executed in parallel or individually as necessary or depending on the processing performance of the device executing the processing. Also, the system regarding the present specification is a logical combination configuration of multiple devices, and so each configuration of the devices is not limited to being housed within the same physical unit.

INDUSTRIAL APPLICABILITY

As previously described, according to the configuration of an embodiment of the present disclosure, a miniaturized non-linear conversion unit is achieved.

Specifically, included is an encryption processing part configured to divide and input configuration bits of data to be processed into a plurality of lines, and to repeatedly execute a data conversion processing applying a round function as to the data in each line, wherein the encryption processing part includes an F function executing unit configured to input one line of data configuring the plurality of lines, and to generate conversion data, wherein the F function executing unit includes a non-linear conversion processing unit configured to execute a non-linear conversion processing, and wherein the non-linear conversion processing unit includes a repeating structure of a non-linear calculation unit made up from either one NAND or NOR, and either one XOR or XNOR calculation unit, and a bit replacement unit. The miniaturized non-linear conversion unit is achieved by this repeating configuration.

REFERENCE SIGNS LIST

700 IC module
701 CPU (Central Processing Unit)
702 memory
703 encryption processing part
704 random number generator
705 transmission/receiving unit

The invention claimed is:

1. A data processing device comprising:
 a data conversion processing circuitry configured to divide and input configuration bits of data to be processed into a plurality of lines, and to repeatedly execute a data conversion processing as to the data in each line;
 wherein the data conversion processing circuitry includes an F function executing unit configured to input one line of data configuring the plurality of lines, and to generate conversion data;
 wherein the F function executing unit includes a non-linear conversion processing circuitry configured to execute a non-linear conversion processing;
 wherein the non-linear conversion processing circuitry includes a repeating structure of n number of non-linear calculation units and n−1 number of bit replacement units, each of the n−1 number of bit replacement units being between a pair of the n number of non-linear calculation units, and outputs n bits of data where n is an integer greater than one.

2. The data processing device according to claim 1, wherein the bit replacement unit includes a wiring configuration configured to shuffle the input and output bits corresponding to the non-linear calculation unit.

3. The data processing device according to claim 1, wherein the non-linear calculation unit included in the repeating structure is a calculation unit configured of either one NAND or NOR calculation unit and either one XOR or XNOR calculation unit;
 and wherein the non-linear conversion processing circuitry outputs one bit of the calculation result from either the NAND or the NOR calculation unit with 2-bit input and 1-bit output to either the XOR or the XNOR calculation unit, executes either the XOR or the XNOR calculation with the other one bit of input data, and outputs the 1-bit data generated from the calculation result of either the XOR or the XNOR as the configuration bit as the non-linear conversion processing result.

4. The data processing device according to claim 1, wherein the non-linear conversion processing circuitry includes the repeating structure in which the non-linear calculation unit is repeating at least the n number of times regarding the configuration to output the non-linear conversion result of n bits of data.

5. The data processing device according to claim 1, wherein the non-linear calculation unit included in the repeating structure is a calculation unit configured of either one NAND or NOR calculation unit and either one XOR or XNOR calculation unit;
 and wherein the non-linear conversion processing circuitry generates the calculation result for either the XOR or the XNOR calculation result from the calculation result of either the one NAND or the NOR calculation unit corresponding to all configuration bits of the data to be non-linearly converted, and outputs either the XOR or the XNOR calculation result as the configuration bit of the non-linear conversion result.

6. The data processing device according to claim 1, wherein the non-linear calculation unit included in the repeating structure is a calculation unit configured of either one NAND or NOR calculation unit and either one XOR or XNOR calculation unit;
 and wherein the non-linear conversion processing circuitry is a configuration including both the XOR calculation unit and the XNOR calculation unit in the repeating structure.

7. The data processing device according to claim 1, wherein the data processing device executes encryption processing to convert plaintext as input data into ciphertext, and to execute decryption processing to convert ciphertext as input data into plaintext.

8. The data processing device according to claim 1, wherein the non-linear conversion processing circuitry includes a repeating structure of a 4-bit input and 4-bit output non-linear calculation unit, and a bit replacement unit.

9. A data processing device comprising:
a non-linear conversion processing circuitry having a repeating structure of n number of non-linear calculation units and n−1 number of bit replacement units, each of the n−1 number of bit replacement units being between a pair of the n number of non-linear calculation units, and outputting n bits of data where n is an integer greater than one;
wherein the non-linear calculation unit is a non-linear calculation unit made up from either one NAND or NOR calculation unit, and either one XOR or XNOR calculation unit;
and wherein the non-linear conversion processing circuitry generates the calculation result for either the XOR or the XNOR calculation result from the calculation result of either the one NAND or the NOR calculation unit corresponding to all configuration bits of the data be non-linearly converted, and outputs either the XOR or the XNOR calculation result as the configuration bit of the non-linear conversion result.

10. A data processing method to be executed in a data processing device;
wherein a data processing circuitry divides and inputs configuration bits of data to be processed into a plurality of lines, and repeatedly executes a data conversion processing as to the data in each line;
wherein a data conversion processing circuitry executes an F function configured to input one line of data configuring the plurality of lines, and generates conversion data;
wherein the execution of the F function executes a non-linear conversion processing by a non-linear conversion circuitry; and
wherein the non-linear conversion processing circuitry includes a repeating structure of n number of non-linear calculation units and n−1 number of bit replacement units, each of the n−1 number of bit replacement units being between a pair of the n number of non-linear calculation units, and outputting n bits of data where n is an integer greater than one.

11. A non-transitory computer readable medium including a computer executable program to execute data conversion processing in a data processing device;
wherein the program causes a data processing circuitry to divide and input configuration bits of data to be processed into a plurality of lines, and to repeatedly execute a data conversion processing as to the data in each line;
and in the data conversion processing to execute an F function configured to input one line of data configuring the plurality of lines, and to generate conversion data,
and in the execution of the F function to execute a non-linear conversion processing; and
wherein the non-linear conversion processing is performed by a repeating structure of n number of non-linear calculation units and n−1 number of bit replacement units, each of the n−1 number of bit replacement units being between a pair of the n number of non-linear calculation units, and outputting n bits of data where n is an integer greater than one.

12. An information processing device, comprising:
memory configured to hold a program;
a processor configured to execute the program; and
a data conversion processing circuitry configured to divide and input configuration bits of data to be processed into a plurality of lines, and to repeatedly execute a data conversion processing as to the data in each line;
wherein the data conversion processing circuitry includes an F function executing unit configured to input one line of data configuring the plurality of lines, and to generate conversion data;
wherein the F function executing unit includes a non-linear conversion processing circuitry configured to execute a non-linear conversion processing; and
wherein the non-linear conversion processing circuitry includes a repeating structure of n number of non-linear calculation units and n−1 number of bit replacement units, each of the n−1 number of bit replacement units being between a pair of the n number of non-linear calculation units, and outputting n bits of data where n is an integer greater than one.

* * * * *